United States Patent
Shyr et al.

(10) Patent No.: US 10,630,502 B2
(45) Date of Patent: Apr. 21, 2020

(54) LOW FREQUENCY ENERGY DISAGGREGATION TECHNIQUES

(71) Applicant: Bidgely, Inc., Mountain View, CA (US)

(72) Inventors: Alex Shyr, Mountain View, CA (US); Vivek Garud, Los Altos, CA (US); Abhay Gupta, Cupertino, CA (US); Mayank Sharan, Vadodara (IN); Pratik Parekh, San Francisco, CA (US); Rohit Aggarwal, San Jose, CA (US)

(73) Assignee: Bidgely Inc., Mountain View, CA (US)

( * ) Notice: Subject to any disclaimer, the term of this patent is extended or adjusted under 35 U.S.C. 154(b) by 0 days.

(21) Appl. No.: 15/844,513

(22) Filed: Dec. 15, 2017

(65) Prior Publication Data
US 2018/0176033 A1    Jun. 21, 2018

Related U.S. Application Data

(60) Provisional application No. 62/434,992, filed on Dec. 15, 2016.

(51) Int. Cl.
*G05D 3/12* (2006.01)
*H04L 12/28* (2006.01)
(Continued)

(52) U.S. Cl.
CPC .......... *H04L 12/2825* (2013.01); *G06F 15/76* (2013.01); *G06N 20/00* (2019.01);
(Continued)

(58) Field of Classification Search
CPC ..................................................... G06Q 50/06
(Continued)

(56) References Cited

U.S. PATENT DOCUMENTS 8,719,186 B2* 5/2014 Amram .................. G06Q 30/04
                                                           705/412
9,275,065 B1   3/2016 Ganesh et al.
(Continued)

OTHER PUBLICATIONS

Armel, Energy Disaggregation, Dec. 2011, Precourt Energy Efficiency Cneter Stanford, pp. 21 (Year: 2011).*
(Continued)

*Primary Examiner* — Suresh Suryawanshi
(74) *Attorney, Agent, or Firm* — Landmark Intellectual Property Law, PLLC

(57) ABSTRACT

The present invention teaches methods of performing appliance itemization based on consumption data, including: receiving at a processor the data; determining if the data includes active signals and/or inactive signals; upon detection of an active signal: detecting and estimating active water heating consumption and lighting consumption; upon detection of an inactive signal: detecting and estimating passive water heating consumption, refrigerator consumption; and detecting vacation mode. Methods are disclosed of appliance itemization based whole house consumption data consumption from an advanced metering infrastructure device, the data being at 15, 30, or 60 minute intervals, including: applying disaggregation models to provide detection and estimation of any lighting, water heating, refrigeration, pool pumps, heating, or cooling appliances; applying rule-based models to provide detection and estimation of any cooking, laundry, entertainment, and/or miscellaneous appliances; wherein the disaggregation models and the rule-based models provide for a near complete appliance level itemization and estimation.

20 Claims, 20 Drawing Sheets

(51) Int. Cl.
*G06N 20/00* (2019.01)
*G06F 15/76* (2006.01)
*H04W 4/38* (2018.01)
*H04W 4/33* (2018.01)
*G06Q 50/06* (2012.01)

(52) U.S. Cl.
CPC .............. *G06Q 50/06* (2013.01); *H04W 4/33* (2018.02); *H04W 4/38* (2018.02)

(58) Field of Classification Search
USPC .......................................................... 700/291
See application file for complete search history.

(56) References Cited

U.S. PATENT DOCUMENTS

| | | | |
|---|---|---|---|
| 10,175,276 B2* | 1/2019 | Fishburn | G01R 21/133 |
| 2011/0046806 A1 | 2/2011 | Nagel et al. | |
| 2012/0101653 A1* | 4/2012 | Tran | G01D 4/004 |
| | | | 700/296 |
| 2013/0103656 A1* | 4/2013 | Sanchez Loureda | G06Q 10/04 |
| | | | 707/693 |
| 2013/0110621 A1 | 5/2013 | Gupta et al. | |
| 2013/0289788 A1 | 10/2013 | Gupta et al. | |
| 2014/0129040 A1 | 5/2014 | Emadi et al. | |
| 2014/0129160 A1* | 5/2014 | Tran | H02J 3/14 |
| | | | 702/61 |
| 2014/0207298 A1* | 7/2014 | Gupta | G05B 15/02 |
| | | | 700/291 |
| 2014/0244057 A1 | 8/2014 | Hamouz et al. | |
| 2015/0039149 A1 | 2/2015 | Forbes, Jr. | |
| 2015/0137792 A1* | 5/2015 | Filippi | G01D 4/00 |
| | | | 324/76.11 |
| 2015/0142347 A1 | 5/2015 | Mohan et al. | |
| 2015/0142695 A1 | 5/2015 | He et al. | |
| 2015/0160099 A1 | 6/2015 | Hamouz et al. | |
| 2015/0215700 A1* | 7/2015 | Sun | G10L 21/0232 |
| | | | 381/94.2 |
| 2016/0070285 A1* | 3/2016 | Gupta | G05F 1/66 |
| | | | 700/295 |
| 2016/0070286 A1* | 3/2016 | Gupta | G05F 1/66 |
| | | | 700/291 |
| 2019/0050430 A1* | 2/2019 | Gupta | G06F 16/215 |

OTHER PUBLICATIONS

Zoha, Non-Instrusive Load Monitoring Approaches for Disaggregated Energy Sensing: A Survey, Sensors, pp. 29 (Year: 2012).*
Zhang, Residential Electric Load Disaggregation for Low-Frequency Utility Applications, 2015, IEEE, pp. 5 (Year: 2015).*
International Search Report completed Apr. 3, 2018; 2 pages.

* cited by examiner

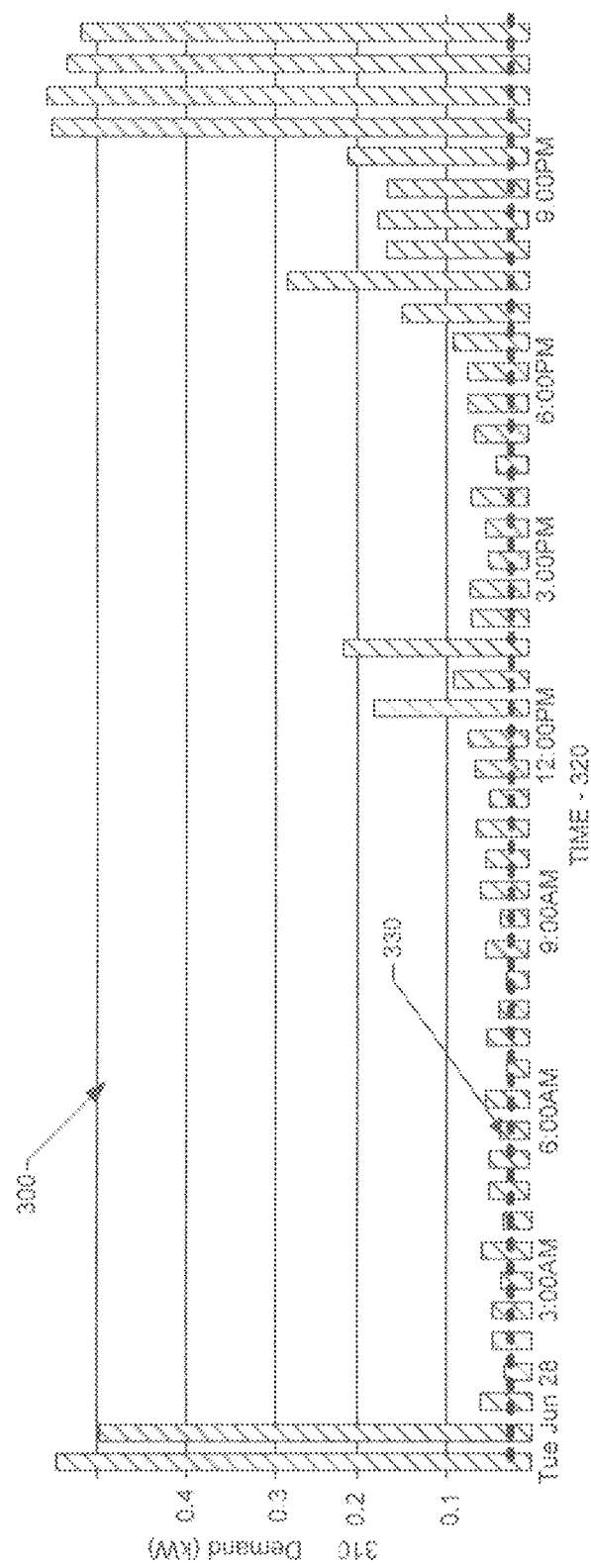

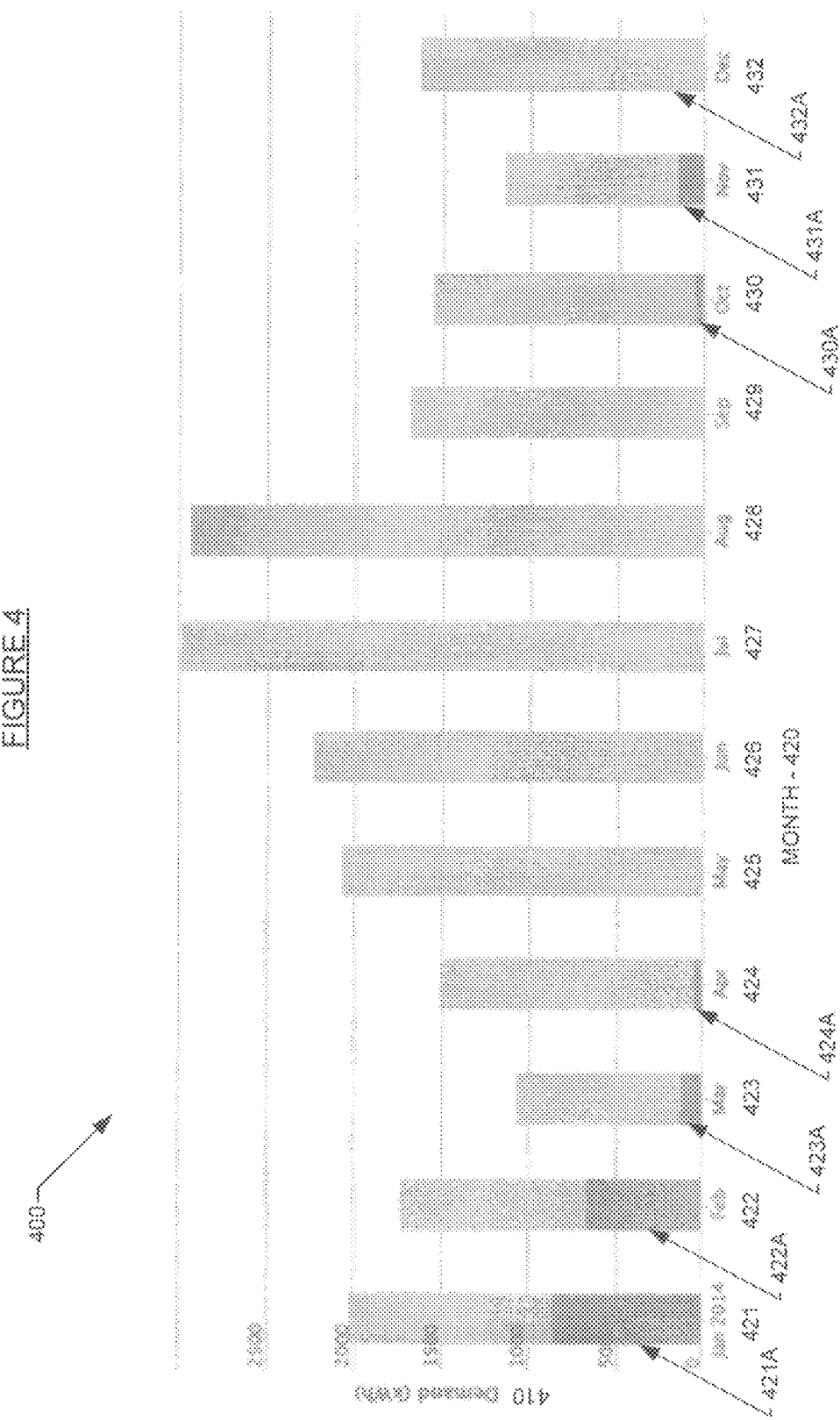

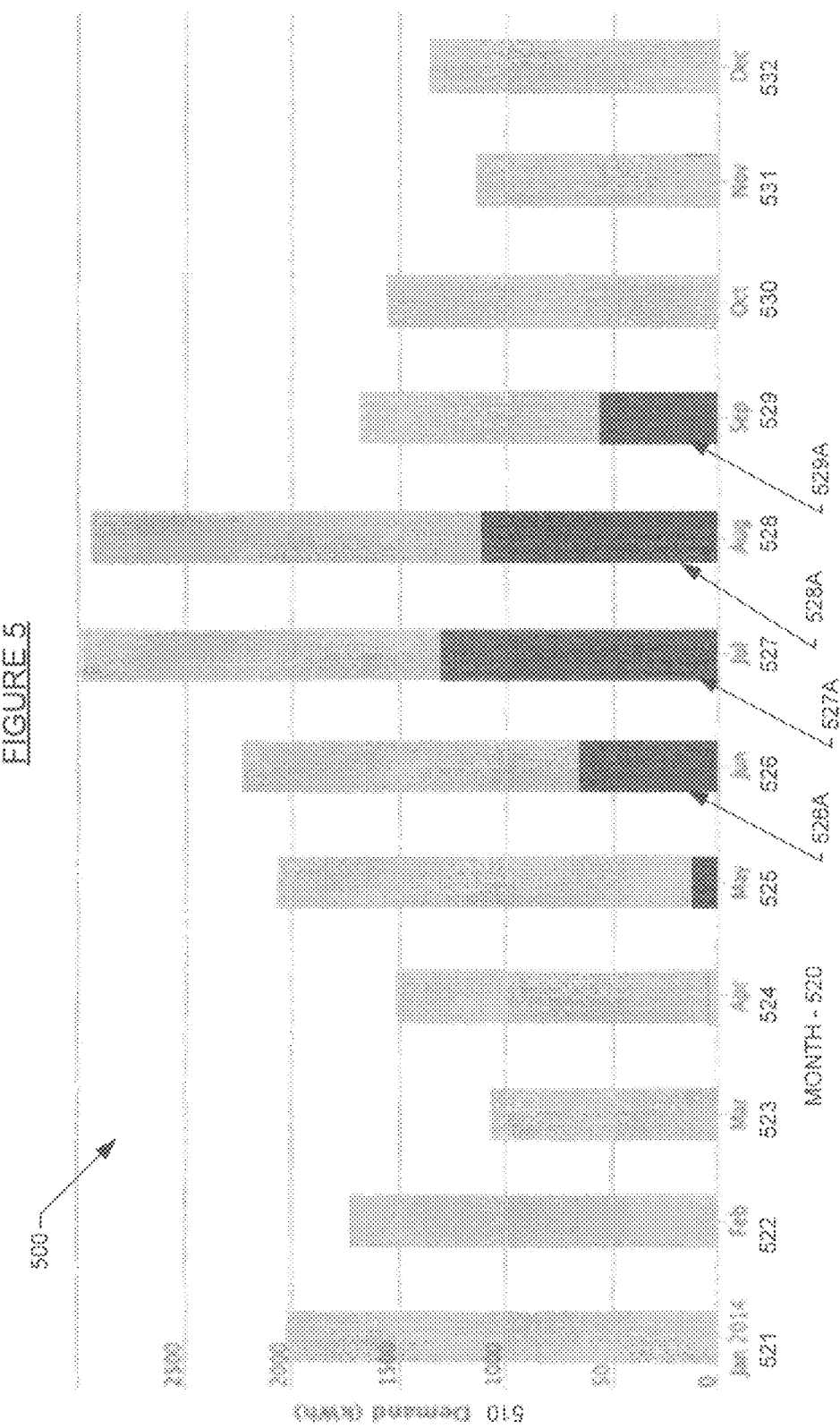

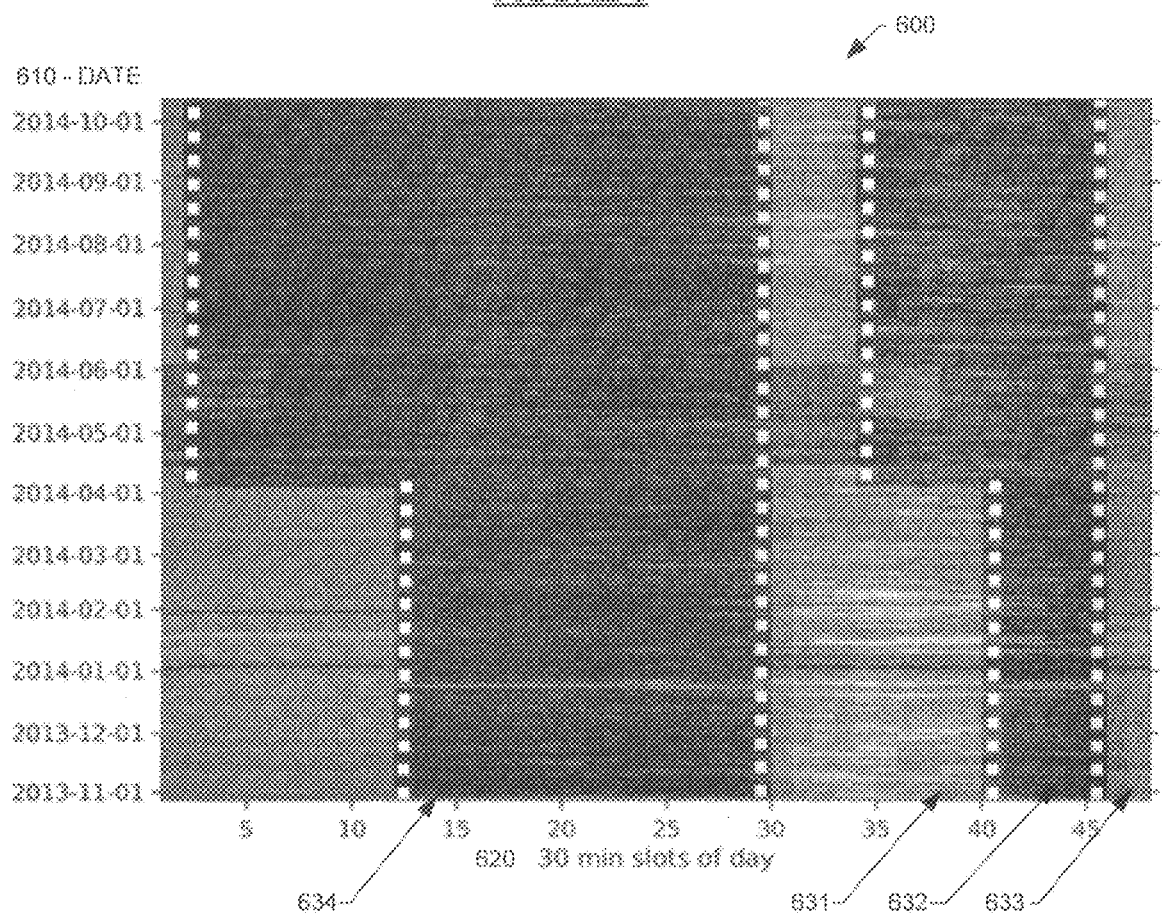
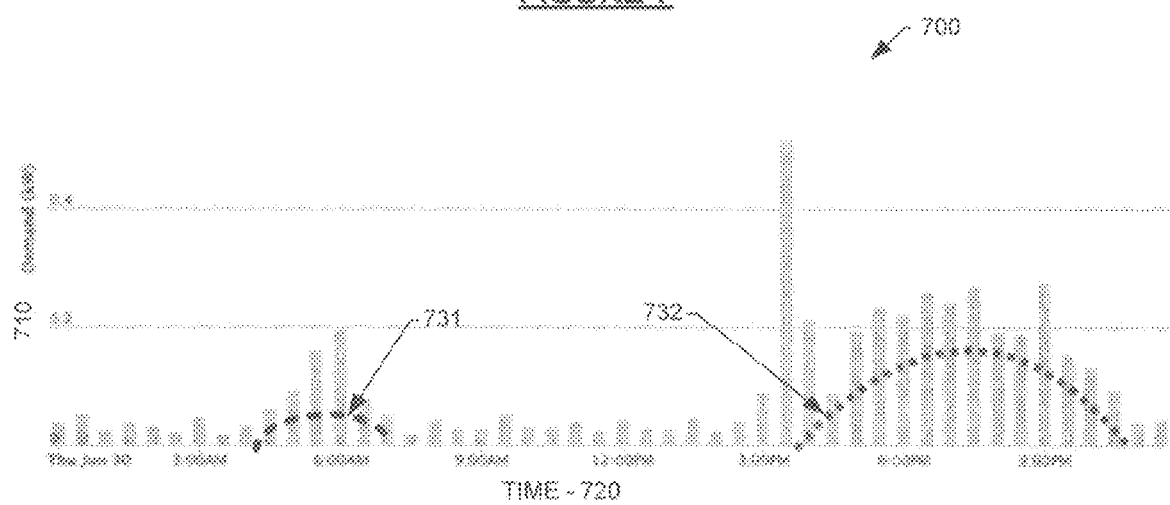

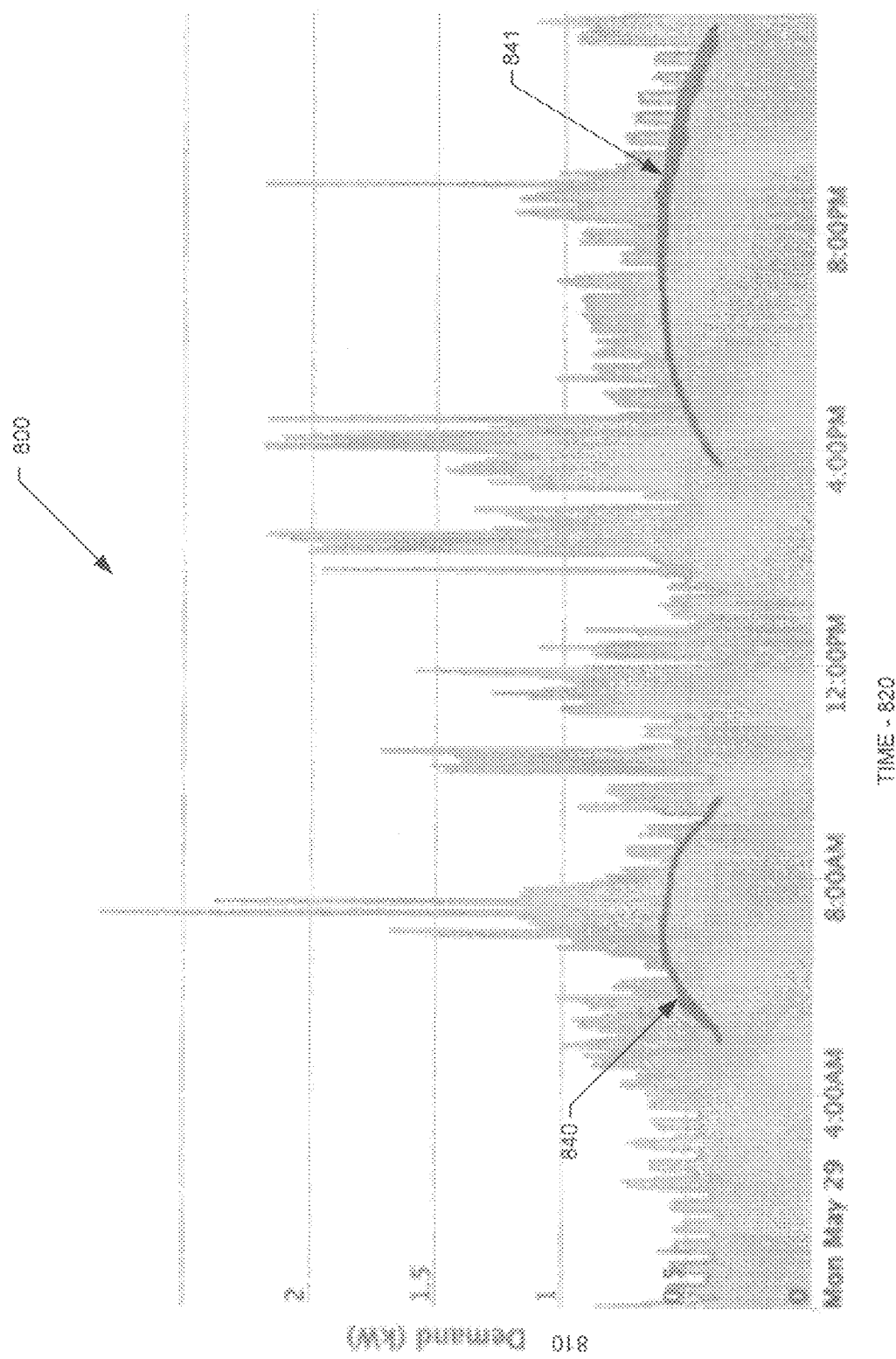

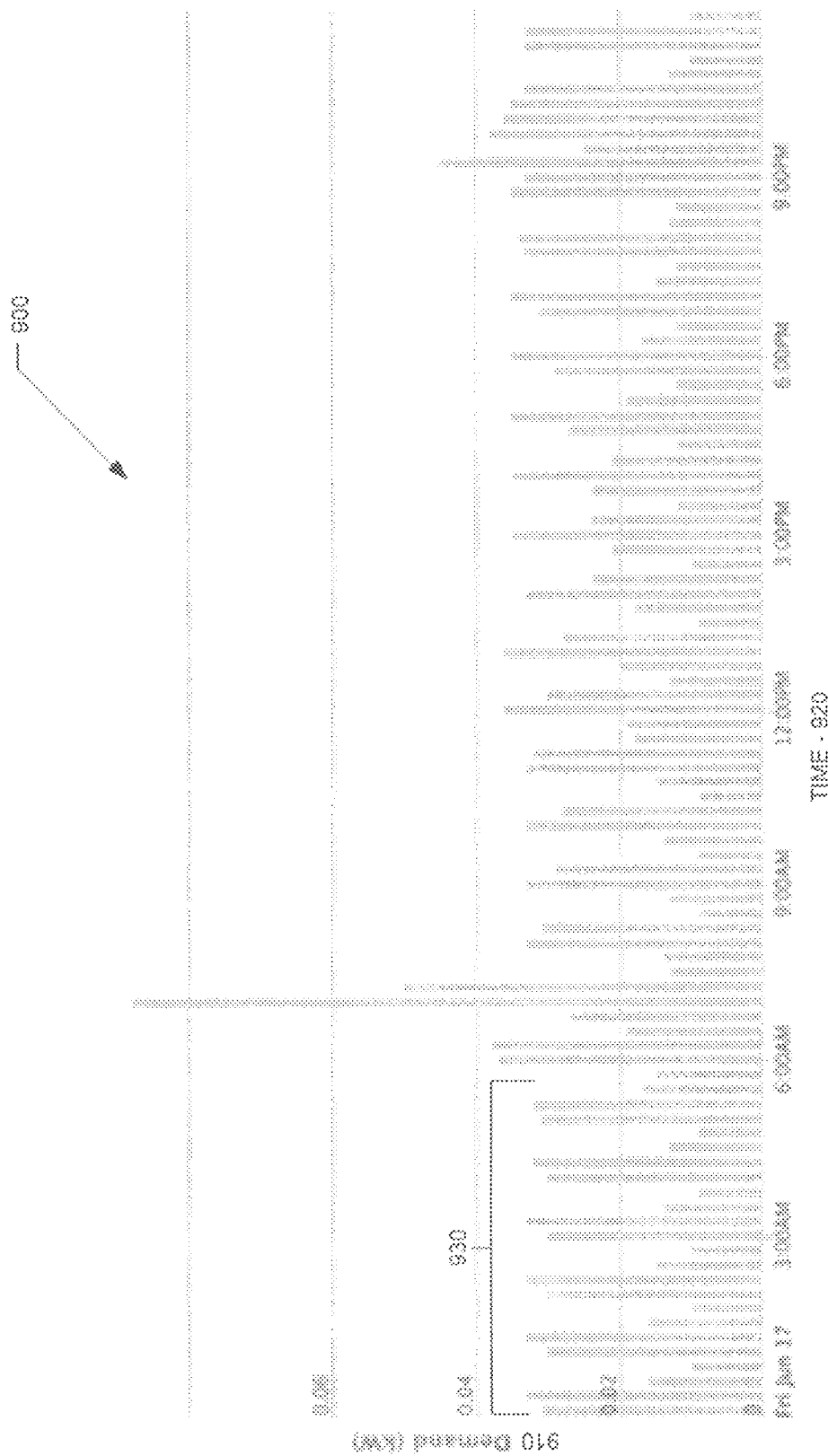

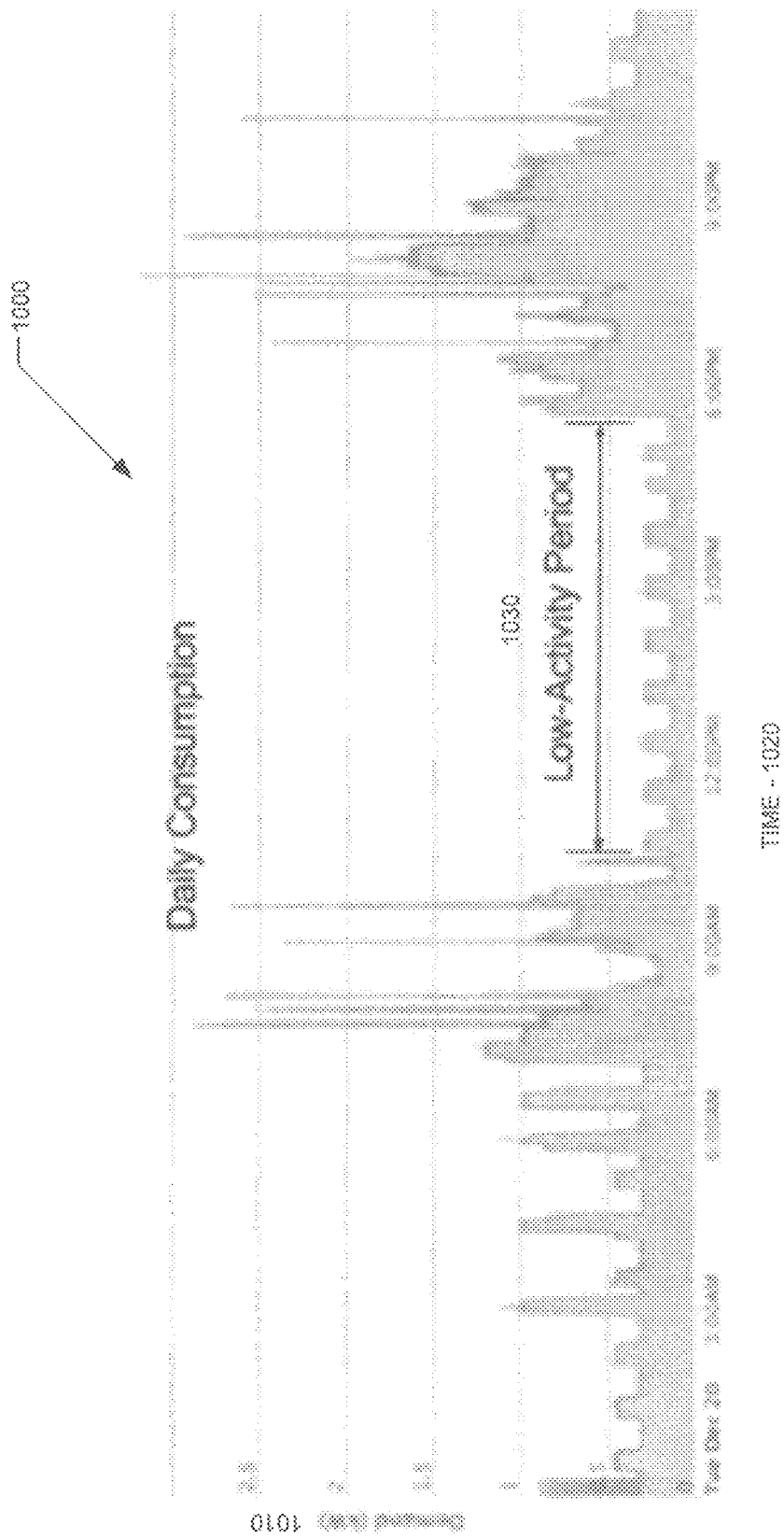

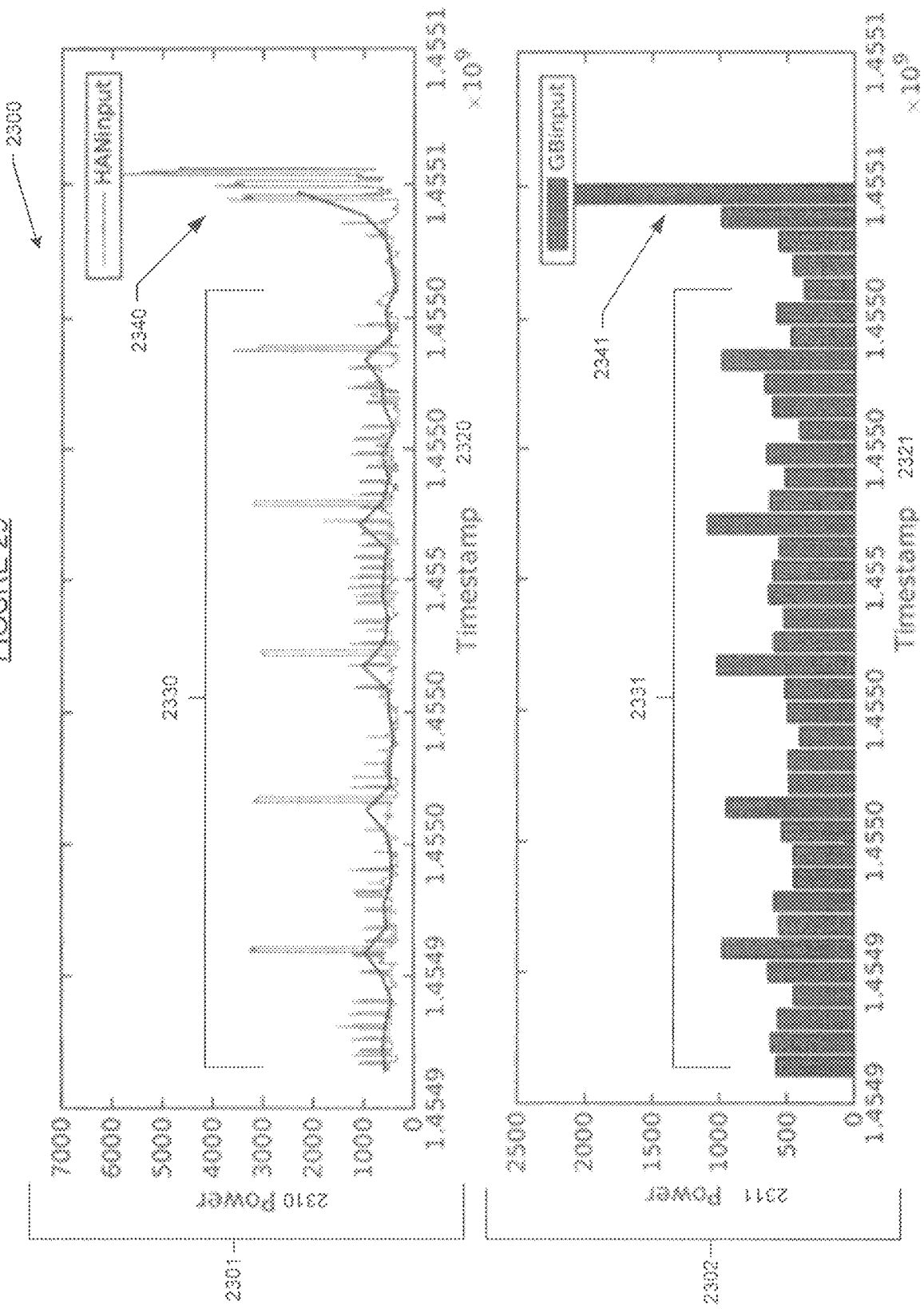

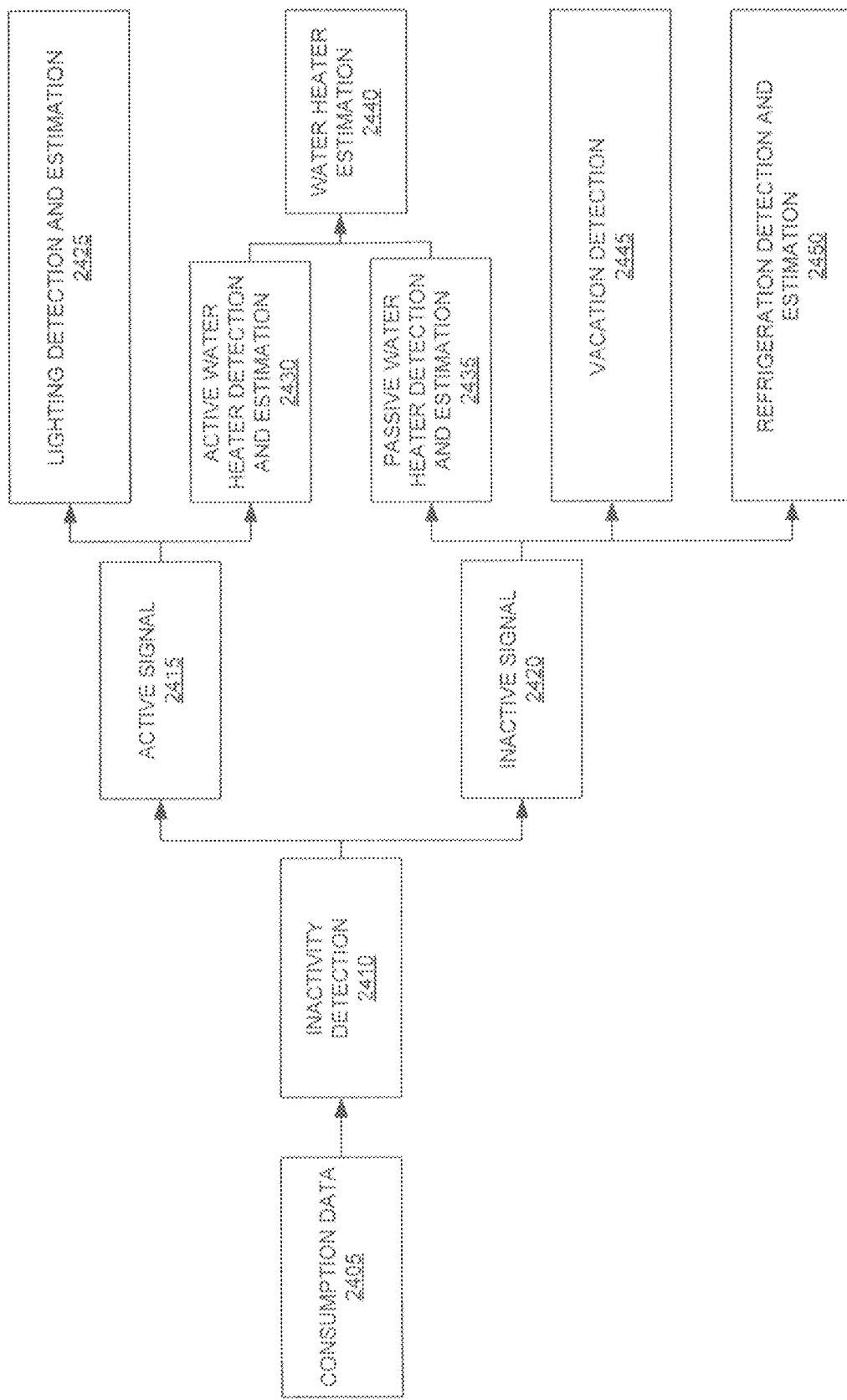

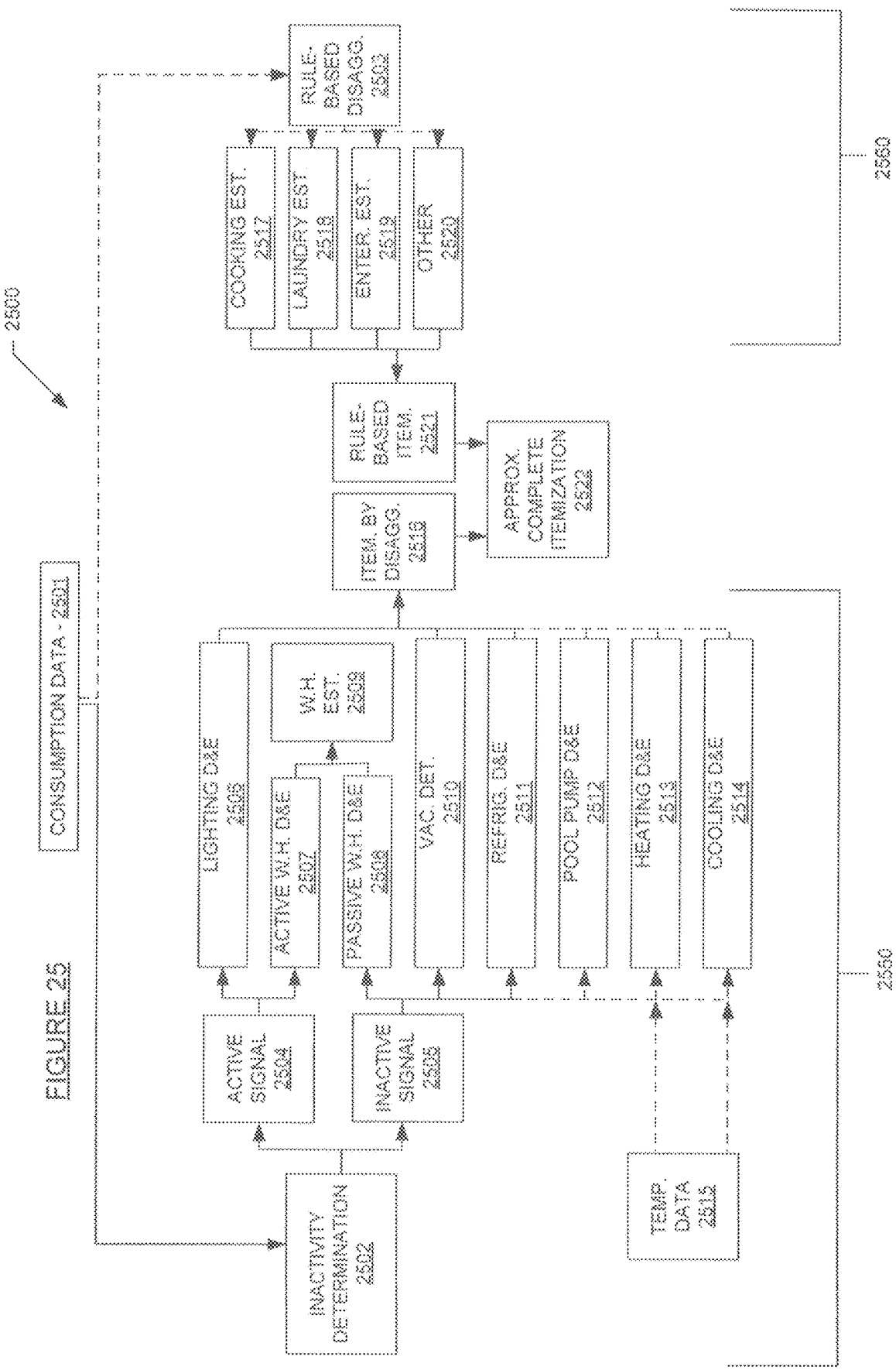

LOW FREQUENCY ENERGY DISAGGREGATION TECHNIQUES

RELATED APPLICATIONS

This application claims priority to U.S. Provisional Patent Application No. 62/434,992, filed on 15 Dec. 2016, entitled "AMI Disaggregation," which is incorporated by reference herein in its entirety.

BACKGROUND

In the residential energy sector, disaggregation is the task of itemizing energy consumption, attributing that consumption to various appliances throughout a home. Generally, disaggregation may be performed on data captured the home, without the need to enter the property.

Once the energy consumption is disaggregated, specific appliance usage or loads, and trends in customer behavior, may be identified. Presenting users with such information in an understandable format may allow users to take appropriate action to actively reduce total energy consumption. Moreover, providing itemized information per specific appliance may also permit users to determine if acquiring a new or replacement appliance (for example, through purchase, lease, or rental) would reduce energy costs sufficient to validate such price of purchase, lease, or rental. Accurate disaggregation may enable personalized and actionable insights to be presented to a customer, which may positively influence customer engagement as well as sentiment towards the energy-providing utility.

Typically, a software analysis is performed on past data collected Therefore such prior art techniques may be useful in breaking down the energy usage or itemizing the electric energy bill post-consumption, but fail to provide near real-time information that may immediately empower users to modify their energy usage. With regard to appliances such as heating or air conditioning—for which usage is based upon immediate conditions—such data of previous usage may provide limited assistance in modifying present behavior and usage.

Moreover, most published techniques use data at a high sampling rate (ranging from one sample every second to one million or more samples per second). However, several available sources of energy use data do not provide such high-resolution data that typically enables specific appliance signatures to be extracted. For example, while utility companies collect data usage, this is typically performed for validation of billing cycles, and is generally collected at a fifteen (15) minute or one hour interval. Accordingly, this data is generally not specific enough for most published NIALM techniques to perform a useful energy disaggregation and generate a clear appliance signature.

However, systems and methods in the existing art generally do not provide for accurate, actionable disaggregated data based on lower resolution data. For example, systems and methods existing in the art generally do not properly or accurately perform disaggregation on data received in 15-minute, 30-minute, or hourly intervals. Such lower-resolution data may be obtained from, for example, advanced metering infrastructure (AMI) devices. For example, AMI may provide automated, two-way communication between a smart meter and a utility. This may provide interval data, as well as real-time data.

Accordingly, systems and methods that can utilize data received from AMI are desirable. More specifically, systems and methods of disaggregation that can be performed on lower resolution data (for example, data sampled at 15-minute, 30-minute, and/or hourly intervals) as received from smart meters over an AMI are desirable.

SUMMARY OF THE INVENTION

Some aspects of the present invention may include a method of performing appliance itemization based on consumption data for a whole house, comprising: receiving at a processor the consumption data; determining by the processor if the consumption data includes active signals and/or inactive signals; upon detection of an active signal: detecting by the processor, based at least in part on the active signal, active water heating, and if active water heating is detected, estimating active water heating consumption; detecting by the processor, based at least in part on the active signal, lighting, and if lighting is detected, estimating lighting consumption; upon detection of an inactive signal: detecting by the processor, based at least in part on the inactive signal, passive water heating, and if detected, estimating passive water heating consumption; detecting by the processor, based at least in part on the inactive signal, refrigeration, and if refrigeration is detected, estimating refrigerator consumption; detecting by the processor, based at least in part on the inactive signal, vacation mode.

Some aspects of the present invention may include a method of performing appliance itemization based on consumption data for a whole house received from an advanced metering infrastructure (AMI) device, the consumption data being of a low resolution comprising data received at fifteen (15) minute, thirty (30) minute, or sixty (60) minute intervals, the method comprising: receiving at a processor the consumption data; determining by the processor if the consumption data includes active signals and/or inactive signals; upon detection of an active signal: detecting by the processor, based at least in part on the active signal, active water heating, and if active water heating is detected, estimating active water heating consumption at least in part by estimating a typical amplitude of a water heater, behavior modeling, and data smoothing, wherein behavior modeling comprises user-specific patterns are modeled, including attributes of time of day and day of week; detecting by the processor, based at least in part on the active signal, lighting based at least in part by identifying arcs of consumption in time periods where lighting is expected to be used, wherein identifying arcs of consumption comprises: removing unsuitable data points from the consumption data; cleaning the consumption data using percentile filtering, minimum value removal, and/or smoothing noise removal; detecting and removing seasonal loads by selecting time points showing seasonal characteristics including contiguous days of absence or presence when typically occurring lighting is absent; extracting a lighting band, comprising a collection of times in a day at which lighting is present; if lighting is detected, estimating lighting consumption at each data point along with lighting capacity parameters, timings of lighting, and seasonality; upon detection of an inactive signal: detecting by the processor, based at least in part on the inactive signal, passive water heating based at least in part on amplitude estimation, frequency estimation, and temperature correlation, and if detected, estimating passive water heating consumption at least in part by estimating typical amplitude and frequency of passive pulses, determined by a power rating of a detected water heater and the typical duration of passive pulses, wherein the duration of passive pulses is a function of a temperature setting of the water heater, insulation of the water heater, and the outside temperature; detecting by the processor, based at least in part on the inactive signal, refrigeration at least in part by analyzing data during low activity periods in which regular pulses of a refrigeration compressor motor are detectable, and if refrigeration is detected, estimating refrigerator consumption at least in part by: analyzing several months of consumption data and identifying low activity periods; scoring each low activity period for quality; compiling low activity periods that meet a quality threshold; using a regression machine learning model to, based on the low activity periods that meet the quality threshold, predict refrigeration consumption; and detecting by the processor, based at least in part on the inactive signal, vacation mode by identifying multiple consecutive days of static, lower-than-average consumption; and providing to a customer an itemization of detected appliances and estimated consumption for each detected appliance.

Some aspects of the present invention may include a method of performing appliance itemization based at least in part on consumption data for a whole house received from an advanced metering infrastructure (AMI) device, the consumption data being of a low resolution comprising data received at fifteen (15) minute, thirty (30) minute, or sixty (60) minute intervals, the method comprising: applying disaggregation models to the consumption data to provide detection and estimation of any present lighting appliances, water heating appliances, refrigeration appliances, pool pumps, heating appliances, or cooling appliances; applying rule-based models to the consumption data to provide detection and estimation of any present cooking appliances, laundry appliances, entertainment devices or appliances, and miscellaneous appliances; wherein the disaggregation models and the rule-based models provide for a complete or near complete appliance level itemization and estimation for the whole house.

These and other aspects will become apparent from the following description of the invention taken in conjunction with the following drawings, although variations and modifications may be effectuated without departing from the scope of the novel concepts of the invention.

BRIEF DESCRIPTION OF THE DRAWINGS

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which:

FIG. 3 depicts, in accordance with some embodiments of the present invention, an exemplary graph of always-on energy usage.

FIG. 4 illustrates, in accordance with some embodiments of the present invention, an exemplary graph of total energy consumption showing space heater consumption.

FIG. 5 illustrates, in accordance with some embodiments of the present invention, an exemplary graph of total energy consumption showing cooling usage energy consumption.

FIG. 6 illustrates, in accordance with some embodiments of the present invention, an exemplary heat map showing pool pump usage.

FIG. 7 illustrates, in accordance with some embodiments of the present invention, an exemplary graph of energy usage with lighting usage indicated thereon.

FIG. 8 illustrates, in accordance with some embodiments of the present invention, an exemplary graph of energy usage with lighting usage indicated thereon.

FIG. 9 illustrates, in accordance with some embodiments of the present invention, an exemplary graph of energy usage of a refrigerator, over a day.

FIG. 10 illustrates, in accordance with some embodiments of the present invention, an exemplary graph of energy usage over a day, indicated refrigerator use.

FIG. 23 illustrates, in accordance with some embodiments of the present invention, a graph of exemplary vacation detection of a electric water heater and a refrigerator.

FIG. 24 depicts, in accordance with some embodiments of the present invention, an exemplary process flow combining algorithms and modules for at least some disaggregation based itemization.

FIG. 25 illustrates, in accordance with some embodiments of the present invention, an exemplary process flow combining modules for at least some disaggregation based itemization with rule based itemization.

Figure 1:
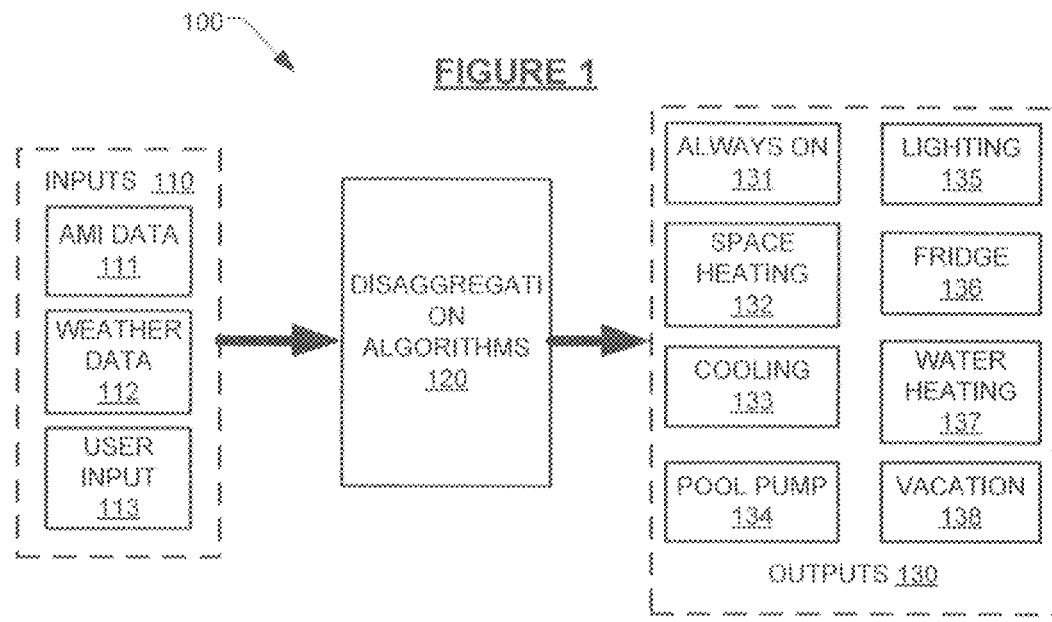
FIG. 1 depicts, in accordance with some embodiments of the present invention, an exemplary disaggregation pipeline, or flow, showing exemplary input sources and types of outputs.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

DETAILED DESCRIPTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular.

In general, the present invention is directed to identifying a number of different appliances by their energy signature. The energy consumption data may be captured by a smart meter or other advanced metering infrastructure (AMI) device. Such consumption data may be obtained from an energy utility, or may be directly accessed from a smart meter, home area network (HAN) device, or other local device. Generally speaking, such determinations may be based on (i) energy consumption data; and/or (ii) weather data, which may include temperature, sunrise, and/or sunset information. At least three (3) metrics may be measured for use in such disaggregation: (a) home level detection; (b) consumption estimation; and (c) home disaggregation coverage.

With reference to FIG. 1, an exemplary flow 100 is presented. Inputs 110 may be provided to one or more disaggregation algorithms 120, which in turn may output appliance identification and/or usage 130. More specifically, inputs 110 may comprise data received from an AMI device 111, weather data 112 (which may include, but is not limited to, temperature, time of sunrise, time of sunset), and/or optional user input 113. Categories of appliances that may be identified may include, but are not limited to, always-on appliances 131, space heating appliances 132, cooling appliances 133, pool pump(s) 134, lighting 135, refrigerator(s) 136, water heating appliances 137, and or vacation detection 138 of appliances.

Home level detection may be a binary value that states that if an appliance has been used within the evaluation time period (for example, a completed billing cycle with an energy utility). In order to invoke customer engagement, accurate detection may be critical—as even occasional improper detections may cause customers to lose confidence in such a system and its recommendations. Note that improper detections may be false positives or repeated false negatives.

Consumption estimation is the delta between actual consumption and disaggregated consumption. Note that customer visibility of estimation errors is minimal at best, since customers generally are not aware of exactly how much energy an appliance consumes over a given period of time, and consumption estimation may be presented as a percentage of whole home consumption.

Home disaggregation coverage is the percentage of whole home energy consumption that may be attributed to identified disaggregated appliance categories. Higher home disaggregation coverage may enable a disaggregating party to provide a larger number of insights and/or recommendations, which may benefit the end-user experience.

Note that appliance disaggregation accuracy metrics may only be presented in the context of ground truth, that is, based on direct observation. However, capturing ground truth across a large number of homes may be challenging, as it may require plug-level appliance monitoring and/or direct communication with the end-user. To counter such challenges, high resolution smart meter data may be used as the baseline for accuracy measurements. This baseline may be established using ten (10) second interval data collected from energy monitors across a wide variety of homes. Such homes may span multiple seasons, climate zones, and may include a broad spectrum of electric appliances. The baseline from these homes utilizing in disaggregation accuracy metrics is greater than 95% accurate, as compared to whole-home measurements. Accordingly, disaggregation of AMI data of a specific home may be compared against the baseline to characterize variances in readings and form changes in AMI disaggregation algorithms.

Expected accuracy certain detection and estimation of systems and methods in accordance with some embodiments of the present invention are set forth in Table 1. Note that the detection and estimation expected accuracies presented in Table 1 are assuming that there is no pre-existing appliance profile for a user. If an appliance profile is available, such accuracy metrics for both detection and estimation will increase.

| Appliance | Home-Level Detection | Consumption Estimation |
| --- | --- | --- |
| Always On | at or approximately 100% | at or approximately 92% |
| Heating | at or approximately 86% | at or approximately 70% (Electric heating only) |
| Cooling | at or approximately 89% | at or approximately 71% |
| Pool Pump | at or approximately 81% | at or approximately 78% |

The present invention may be applicable to electric consumers regardless of international location. Accordingly, machine learning processes in accordance with some embodiments of the present invention may benefit from access to a dynamic and increasing database of appliance signatures. Such access may cause continual improvements in algorithms resulting in greater detection and estimation accuracy for production appliances, as well as providing continual exposure to new appliances, which may then be added to a disaggregation roadmap, or approach. Table 2 indicates coverage results of the present invention in different global areas. Note that such coverage may include always on appliances, heating appliances, cooling appliances, pool pumps, lighting, and/or refrigeration.

| Market | Low HVAC | High HVAC |
| --- | --- | --- |
| Europe | at or approximately 55% | at or approximately 65% |
| North America | at or approximately 60% | at or approximately 70% |
| Asia-Pacific | at or approximately 60% | at or approximately 70% |

While disaggregation based on AMI data alone is continually improving, certain limitations may not allow for 100% disaggregation coverage of a home. To address this limitation and better engage customers, in accordance with some embodiments of the present invention a hybrid approach may be utilized. Such a hybrid approach may combine AMI disaggregation algorithms with a localized rule-based model, which may result in 100% (or near 100%) itemization of energy consumption for each user.

Figure 2:
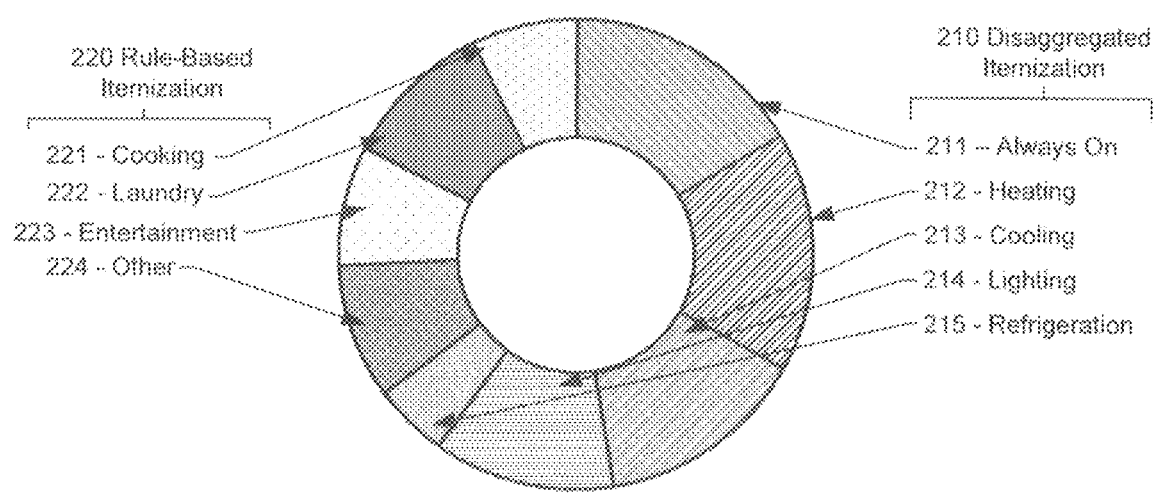
FIG. 2 depicts, in accordance with some embodiments of the present invention, an exemplary chart of itemization of appliances as determined by disaggregation and/or a rule-based model.

FIG. 2 indicates a chart 200 of an exemplary 100% disaggregated home. Some of the appliances are identified by disaggregation 210, while others are identified through rule-based models 220. More specifically, with reference to FIG. 2, always on appliances 211, heating appliances 212, cooling appliances 213, lighting 214, and refrigeration 215 may be identified by disaggregation of AMI data. Cooking appliances 221, laundry appliances 222, entertainment devices 223, and/or other appliances 224 may be identified by a rule-based model. More information on this hybrid approach may be found in technical white paper entitled "100% Appliance Itemization" available at http://www.bidgely.com/white-papers, which incorporated by reference herein in its entirety.

As noted above, disaggregation based on AMI data may be used to identify energy usage for (i) always on appliances; (ii) heating appliances (including, but not limited to, space heaters); (iii) cooling appliances; (iv) pool pumps; (v) lighting; (vi) refrigeration appliances; (vii) water heating appliances; (viii) and vacation detection. Each will be discussed in turn below.

Always on Appliances.

Always on appliances may comprise appliances that are always plugged in, and drawing electricity. Such always on appliances may be identified by capturing the smallest consumption interval during the day and extrapolating that usage across a twenty-four (24) hour period. With reference to FIG. 3, whole house data indicating always one appliances 300 is discussed. The graph in FIG. 3 shows electrical demand 310 across time 320. It can be seen that the smallest consumption during the day may be identified in the window between approximately 2:00 AM to approximately 9:00 AM. In FIG. 3, this is indicated by the dashed line 330, which may correspond to the lowest measured consumption interval for the day at approximately 20 kW. Extrapolating this across the day provide the daily always on consumption. Note that in order to accurately identify always on appliances, data spanning at least one (1) week is desirable, and such data may be of relatively low resolution, at fifteen (15) minutes, thirty (30) minutes, or sixty (60) minute intervals.

Heating Appliances.

Space heaters may also be identified using disaggregation of AMI data. In order to accurately identify heating appliances, data spanning all seasons (i.e. at least one (1) years' worth of data) may be desirable. Such data may be relatively low resolution at fifteen (15) minutes, thirty (30) minutes, or sixty (60) minute intervals. In general, such disaggregation may be temperature-based, wherein temperature data may be correlated with energy consumption, noting that heating appliance usage corresponds to low temperature/high usage days. During colder months (generally October through March in the northern hemisphere), the use of heating appliances generally results in an increase whole-home energy consumption.

With reference to FIG. 4, graph 400 illustrates an exemplary whole home energy consumption over a year, indicating heating appliance usage. The graph 400 indicates energy demand 410 by month 420. It can be seen that the energy usage for January 421 includes energy attributable to heating appliances 421A. Similarly, February 422/422A, March 423/423A, April 424/424A, October 430/430A, November 431/431A, and December 432/432A each include energy usage attributable to heating appliances. Note that May 425, June 426, July 427, August 428, and September 429 do not include any energy usage attributable to heating appliances.

Cooling Appliances.

Similar to heating appliances, cooling appliances may also be identified using disaggregation of AMI data. In order to accurately identify cooling appliances, data spanning all seasons (i.e. at least one (1) years' worth of data) may again be desirable. Such data may be relatively low resolution at fifteen (15) minutes, thirty (30) minutes, or sixty (60) minute intervals. In general, such disaggregation may be temperature-based, wherein temperature data may be correlated with energy consumption, noting that cooling appliance usage corresponds to high temperature/high usage days. During warmer months (generally May through September in the northern hemisphere), the use of cooling appliances generally results in an increase whole-home energy consumption.

With reference to FIG. 5, graph 500 illustrates an exemplary whole home energy consumption over a year, indicating cooling appliance usage. Note that the whole house energy usage is the same as presented in FIG. 4. The graph 500 indicates energy demand 510 by month 520. It can be seen that the energy usage for May 525 includes energy attributable to heating appliances 525A. Similarly, June 526/526A, July 527/527A, August 528/528A, and September 529/529A each include energy usage attributable to cooling appliances. Note that January 521, February 522, March 523, April 524, October 530, November 531, and December 532 do not include any energy usage attributable to cooling appliances.

Pool Pumps.

Pool pumps may also be identified from disaggregated AMI data. In general, data spanning approximately one (1) month is desirable for identifying a pool pump. Again, such data may be relatively low resolution at fifteen (15) minutes, thirty (30) minutes, or sixty (60) minute intervals. In general, identifying a pool pump may be based on timing. Homes with a pool often run the pool pump for the filtration system on a timer. Therefore, multiple days of data may be examined to identify consistent start/stop times of high activity to detect a pool pump schedule.

With reference to FIG. 6, a heat map of energy usage 600 is shown. The heat map shows the approximately a years' worth of data by month 610, showing usage in thirty (30) minute time slots 620. It can be seen that the pool pump runs during the portion indicated at 631, turns off for the portion indicated at 632, turns on for the portion indicated at 633, and turns off for the portion indicated at 634. The pool pump here consistently turns on at time slot 30 (approximately 3:00 PM), as well as at time slot 46 (approximately 11:00 PM). Note that the pool pump runs for a longer time in November-April, and runs a shorter time in May-October. This is indicative of a southern hemisphere pool, where the warmer months are November-April.

Lighting.

Lighting may also be identified from disaggregated AMI data. Lighting is typically one of the most consistent electrical consumptions in most households across the world. Statistically speaking, lighting generally makes up approximately 10% of the electrical consumption of an average home. Adoption of efficient lighting practices can lead to clear decreases in power consumption of a house.

In general, data spanning at least approximately one (1) month is desirable, although data spanning one (1) year is considerably more desirable, and such data may be relatively low resolution at fifteen (15) minute, or thirty (30) minute intervals. Note that data in sixty (60) minute intervals may be too rough, or too low resolution to adequately and confidently identify lighting. In general, lighting may be determined based on timing, and is generally characterized by a consistent "arc" in energy usage during the mornings and evening. Such usage is generally consistent with usage during waking-morning activity-leaving for work, as well as arriving home-evening activity-going to bed. With reference to FIG. 7, a graph 700 of energy demand 710 over time 720 is presented. Increases in energy demand around 6:00 AM and starting around 3:00 PM may be seen. These formulate the lighting "arcs," denoted at 731 and 732.

The input data may be in the form of a time series consumption signal at the periodicity of the order of minutes. The methodology in accordance with some embodiments of the present invention may work on signals with periodicity of the order of seconds by down-sampling the signal. External data such as geographic location, sky cover, daylight hours, house information such as size and number of occupants can be used to further improve and derive inferences from the estimate.

In general, lighting presents itself in the data often as a downward facing curve as shown in FIG. 7. Often this is because in the number of lights in operation increases and then decreases, also with time the power consumption of light sources usually increases. Mostly due to routine based behavior, there are often patterns during morning and evening times. In generally, disaggregation approaches based on AMI data may look to capture the same pattern in the input data and estimate the lighting usage through the steps discussed below.

First, the consistent nature of lighting is captured. Unsuitable data points may be removed and the data may be cleaned using techniques such as percentile filtering, minimum value removal and/or smoothing noise removal. Seasonal loads may then be detected and removed by selecting time points showing seasonal characteristics, such as contiguous days of absence and/or presence in times when typically occurring lighting is absent. A lighting band may then be extracted. The lighting band may be a collection of times in a day at which lighting is present in the data. This collection of time point may include basic sanity checks placed on its size. Using seasonal detection, power capacities of lighting during various timing zones in the day may the be computed.

Lighting may be estimated at each time point based on the time in its day, seasonality, the typicality of lighting at that time, lighting capacity, and/or other factors. Interpolation techniques may be used to estimate values at points where the exact value cannot be confidently determined. New incoming data in cases where lighting equipment has been modified at the end user location may be detected using the seasonality, percentile calculations on the new data, and comparison with parameters computed on previous data.

This technique may provide information about the usage of lighting which often is responsible for roughly 10% of the electricity consumption in a house. The output of the algorithm may be lighting energy consumption at each data point along with capacity parameters, timings of lighting and seasonality. Based on this information a utility (or other party) may be able to engage with customer, armed with specifics, to discuss items such as (i) informing users of their lighting consumption behavior and suggestions of power saving solutions; (ii) determine if lighting in a house is efficient and suggest changes to homes with inefficient lighting; (iii) analyze lighting usage trends based on regions, home characteristics, etc., to provide insights into the consumption demographic that may be used by utilities for targeted initiatives; and/or (v) provide alerts to users if lighting has been left switched on and other indicators suggest that the house should be empty.

FIG. 8 depicts a graph 800 showing energy usage data 830 based on energy demand 810 over time 820. Again, arcs due to increased lighting using can be seen at 840 and 841.

Supplementary ideas from image analysis maybe borrowed to increase lighting estimation robustness and accuracy. For example, each daily consumption pattern may be matched to another, allowing for certain affine transformations, such as translation and scaling of the lighting arcs. These may serve as estimation methods on their own, or may be treated as the pairwise distance metric in a clustering algorithm. Such clustering models may be able to find cluster centers, or distinct modes of lighting behavior, for each home.

Additionally, techniques that directly make use of external factors such as house attributes, number of occupants and sunrise/sunset times may help improve robustness and interpretability of the lighting estimates. Load prediction may include these factors and generate a typical lighting load from them.

Refrigeration Appliances.

Refrigerators may also be identified from disaggregated AMI data. Refrigerators are present in approximately 99% of homes in developed countries. These appliances typically run continuously throughout the day. Refrigerators have compressors that turn on and off depending on its temperature setting. Since they are usually smaller in power consumption, it may be difficult to estimate consumption when other appliances are running. However, note that it is also possible to detect refrigerators when few other high energy appliances (e.g. dryers, AC, heater) are running.

In general, data indicating low activity periods is desirable for identifying a refrigerator, such as early mornings, in which the regular pulses of the compressor motor are detectable. Such data may be relatively low resolution at fifteen (15) minute or thirty (30) minute intervals. Note that thirty (30) minute interval data is probable in most cases, but this may depend on the size and shape of the refrigerator signature.

FIG. 9 illustrates a graph 900 showing demand 910 over time 920. Energy demand is shown, with a low usage period of time seen around 12:00 AM to 5:30 AM, indicated at 930. It is these times of low usage where refrigerator compressor motor pulses cycling on and off may be most easily identified. Note that the pulses of the refrigerator motor may be quite consistent throughout the day.

FIG. 10 again shows a graph 1000 illustrating demand 1010 over time 1020. In FIG. 10, low activity period 1030 is quickly apparent. The energy demand during low activity period 1030 is likely comprised of pulses from the refrigerator motor.

Figure 11:
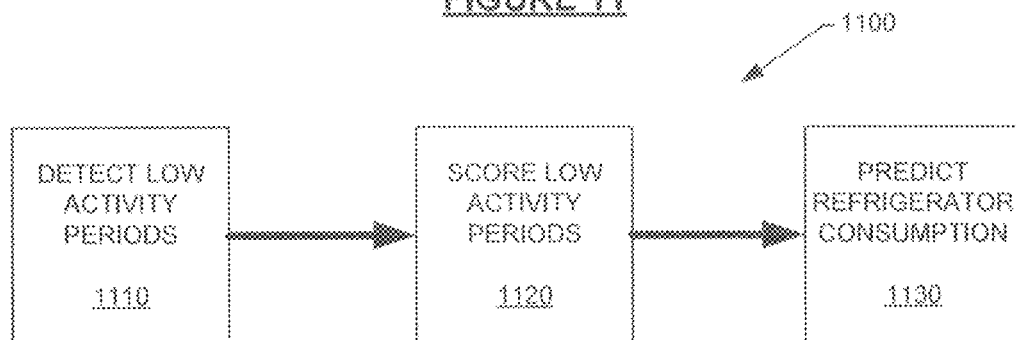
FIG. 11 depicts, in accordance with some embodiments of the present invention, a flow chart indicating an exemplary methodology for identifying refrigerator energy usage.

With reference to FIG. 11, an exemplary process for identifying refrigerator usage is set forth. In general, the process involves searching through several months of signal data for low activity periods. Subsequently, a model may be used to score each low activity period for quality. All low activity periods that satisfy a quality threshold may then be considered for refrigeration estimation. A machine learning model may be used to then predict refrigeration energy consumption.

At 1110, systems and methods in accordance with some embodiments of the present invention may detect or identify low activity periods. At 1120, such low activity periods may be scored for quality. The quality metric for the low activity period intervals may utilize a scoring mechanism based on a machine learning model. The model may be trained based on human training and/or ground truth based at least in part on data collected from plug level devices. The quality metric for low activity period may also utilize scoring based on consistency of several attributes across multiple low activity periods for a home.

Low activity periods that meet a minimum quality threshold may then be used to create a refrigeration estimation, and at 1130, predict refrigerator consumption. Prediction of refrigeration consumption may be performed using, for example, a regression model based at least in part on a training set. A training set may be produced using plug-level metering or using disaggregation results based on higher sampling rates of less than 1 minute. The refrigeration consumption may be calculated on a per month basis depending on availability of good quality low activity periods for each month. If such data is not available, a single refrigeration number may be produced across multiple months. Refrigeration estimation across the year may be smoothed using local temperature to ensure refrigeration consumption follows a trend where consumption increases with high temperatures. The degree to which refrigeration consumption varies with temperature may be a region-specific configuration.

Figure 12:
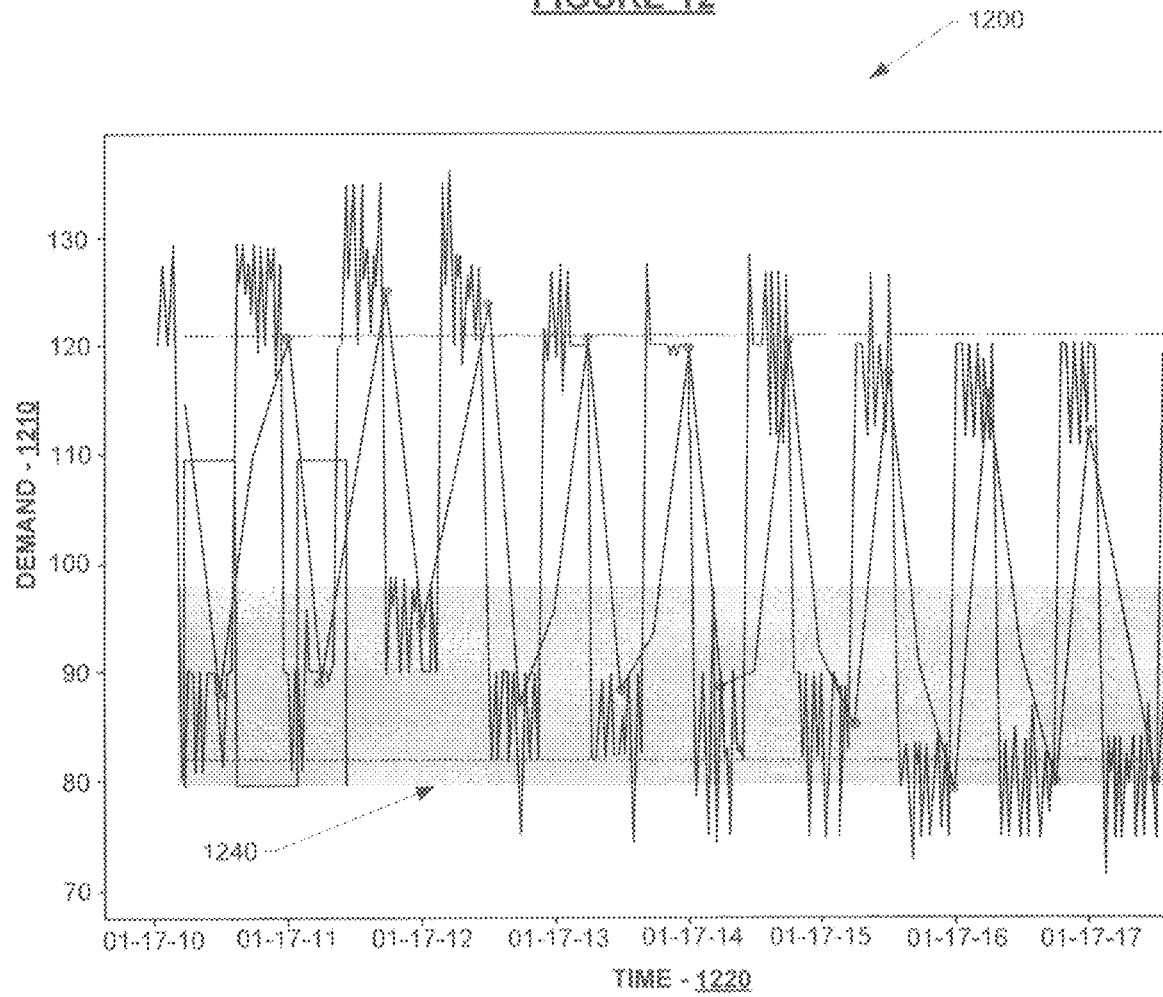
FIG. 12 depicts, in accordance with some embodiments of the present invention, an exemplary graph of energy usage utilized in a sliding window function, used at least in part to identify refrigerator usage.

Detection of low activity periods may utilize a sliding window function and features, such as closeness to the daily minimum, autocorrelation, upper limits on values, consistent area under the curve (after subtracting the always-one consumption), etc. FIG. 12 illustrates a graph 1200 showing demand 1210 over time 1220 (for a period of approximately seven (7) hours), and showing the area under the curve 1240. This area under the curve 1240 is visually close to the amortized refrigerator consumption.

Water Heating Appliances.

Water heaters may also be identified from disaggregated AMI data. In general, data spanning approximately one (1) month is desirable for identifying a water heater. Again, such data may be relatively low resolution at fifteen (15) minute or thirty (30) minute intervals. An electric water heater may be an important appliance that, when present, accounts for a significant portion of the whole-house electricity consumption. In general, there are three (3) main types of water heaters: tank water heaters, tankless water heaters, and scheduled storage water heaters.

A tank water heater may generally comprise a large tank of water, which is heated and maintains the water temperature within a certain range. In general, a tank water heater has an energy consumption pattern that may include (i) a series of "passive" pulses, which may turn on and/or off without explicit user action; and (ii) occasional "active" or "fat" pulses, which may represent continuous, active usage of hot water (such as a shower, laundry, dishes, etc.).

Figure 13:
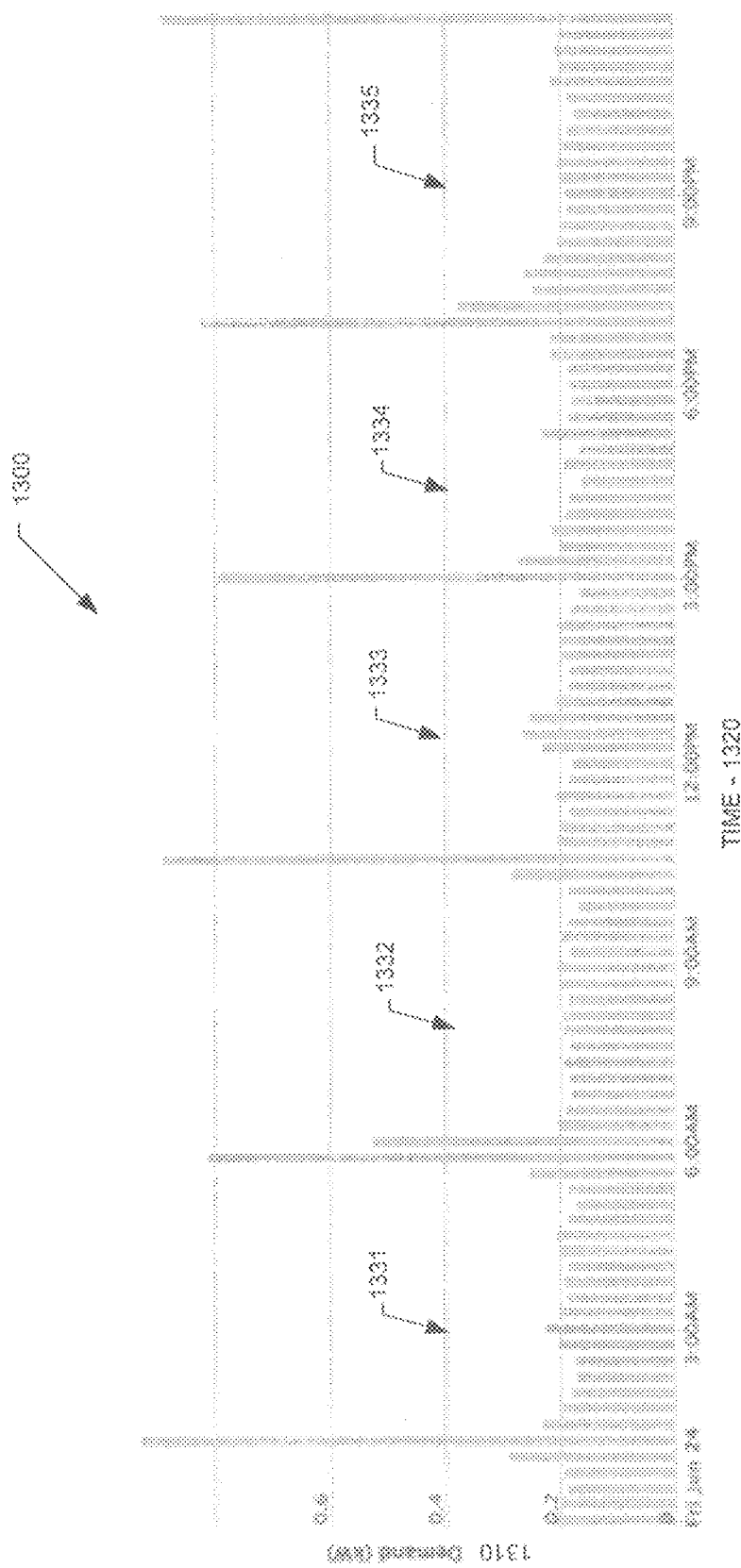
FIG. 13 illustrates, in accordance with some embodiments of the present invention, an exemplary graph of energy usage of a water heater, over a day.

FIG. 13 illustrates a graph 1300 showing energy demand 1310 over time 1320 for a tank water heater and periodic pulses caused by maintaining the tank water at or near a certain temperature. Pulses 1331, 1332, 1333, 1334, 1335, and 1336 may be seen to periodically occur. Such pulses may indicate the use of a tank water heater.

Figure 14:
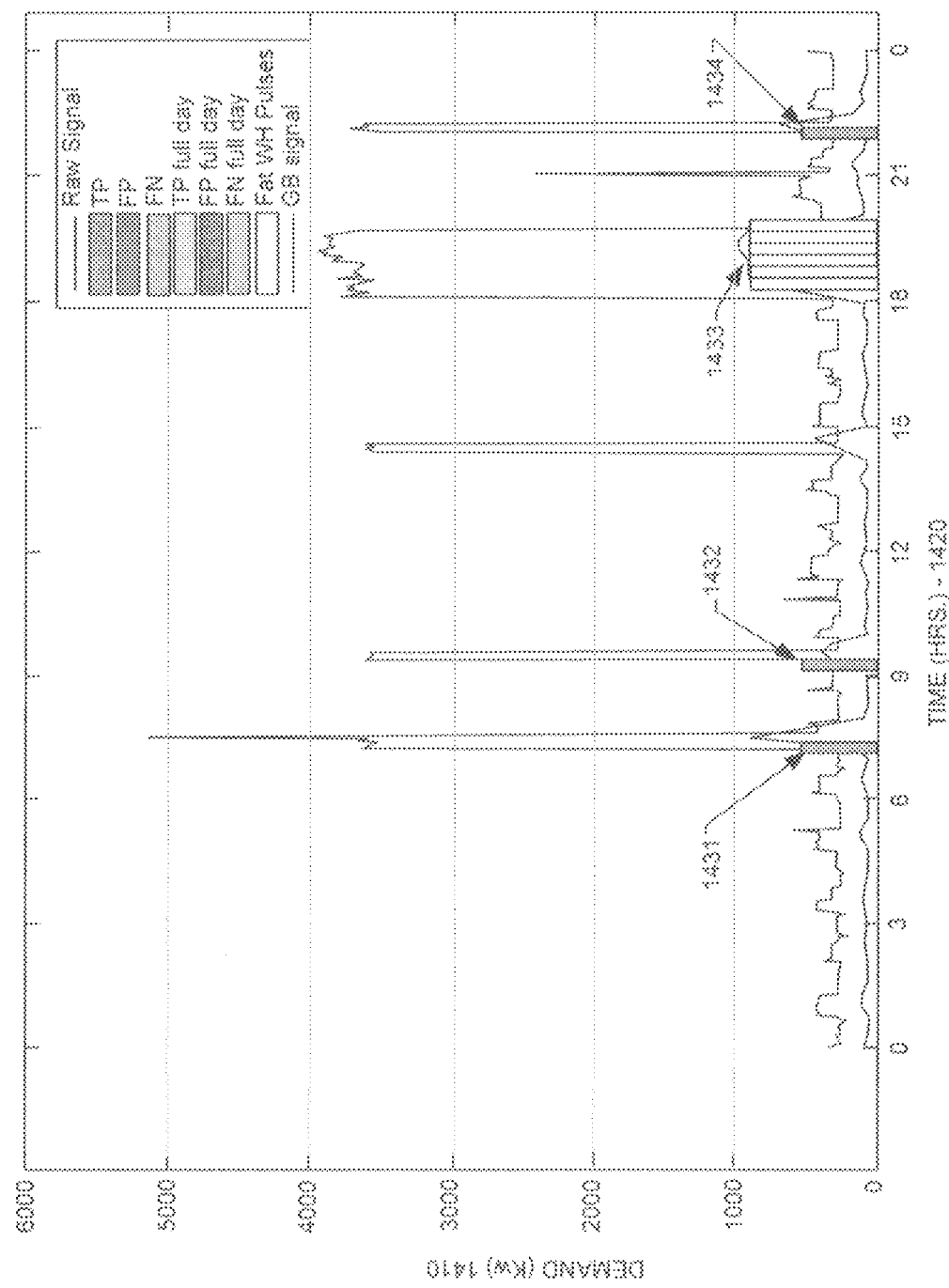
FIG. 14 illustrates, in accordance with some embodiments of the present invention, an exemplary graph of energy usage of a tank water heater.

FIG. 14 illustrates a graph 1400 showing more detail of energy demand 1410 over time 1420. Different pulses may be identified in the data. For example, at 1431, 1432, and 1434 pulses caused by temperature maintenance may be seen. At 1434, a series of "fat" pulses may be seen. Such "fat" pulses may be caused by user initiated water use, such as a shower, laundry, dishes, etc. Notably, such peak water heater use appears to occur between 6:30 PM and 9:30 PM, when laundry, dishes, dishwashers, bathtubs, etc. are likely used.

Figure 15:
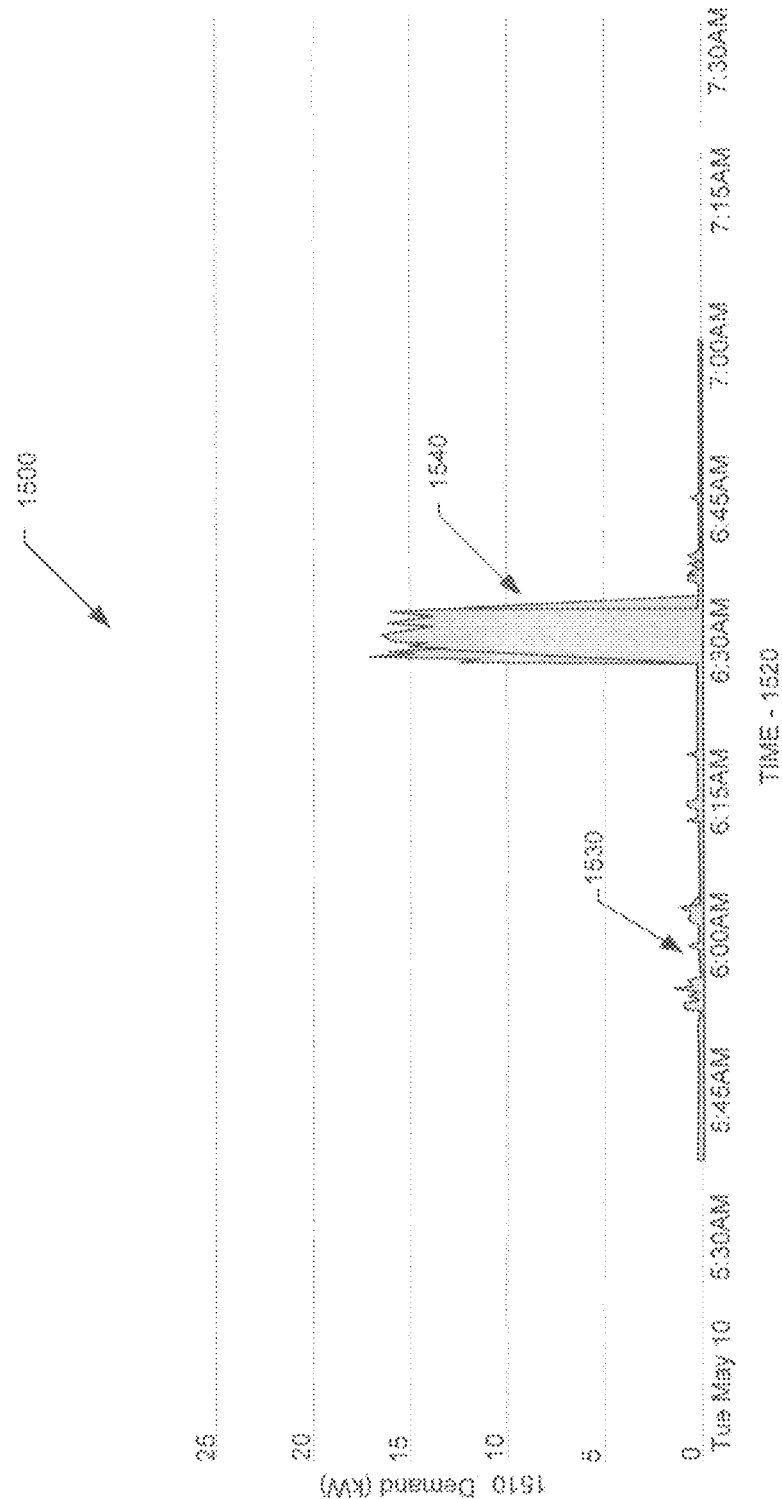
FIG. 15 illustrates, in accordance with some embodiments of the present invention, an exemplary graph of energy usage of a tankless water heater.

A tankless water heat, otherwise known as an instant hot water heater or flow water heater, does not have a tank. Instead, such systems provide a direct connection from the cold water to the point of use. A tankless system may either heat the water as needed for the entire house (where the system may be placed outside the home, or in a garage, basement, crawl-space, etc.), or may comprise elements at the point of use that heat the water (such as a heating system disposed at a sink to heat hot water for the sink). Such systems may present a relatively high amplitude (3-5 kW for kitchen use), or even a very high amplitude (greater than 10 kW for showers). For example, FIG. 15 illustrates a graph 1500 showing energy demand 1510 over time 1520 for a German instant water heater. Smaller use of the water heater may be seen at 1530 (around 5:50-6:15 AM), which may represent initial waking activities. However, at 1540 the demand jumps for the use of the water heater for a morning shower, occurring at about 6:30 AM. Similar high amplitude draws may be seen for other types of instant hot water heaters, such as but not limited to the Quooker device used in kitchens for instant hot water.

Figure 16:
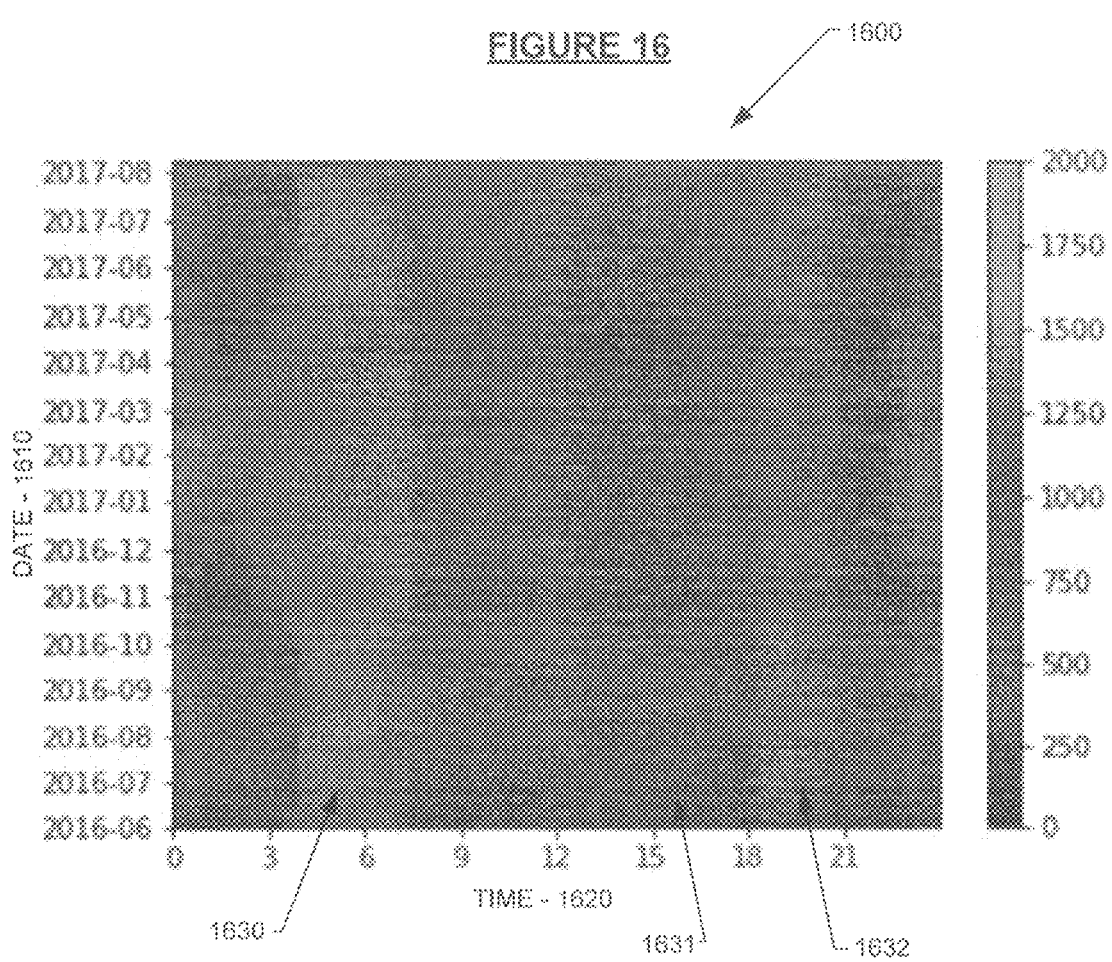
FIG. 16 illustrates, in accordance with some embodiments of the present invention, an exemplary heatmap showing scheduled water heater usage.

A scheduled storage water heater may generally comprise a tank of water that is scheduled to turn on during a time period when rates or tariffs are lower, typically during the night due to time-of-use plans. A scheduled storage water heater may turn on for longer periods off time, and/or at a higher power rating, depending on the temperature, and may also include sporadic, thin, "passive" pulses near the end of the day to maintain a minimum desired water temperature. FIG. 16 illustrates a heat map 1600 showing the use of a scheduled storage water heater. In general, the heat map shows the date 1610 on the Y axis, and the time on the X axis, with the usage extending along the X axis. From the heat map, it can be seen that the scheduled storage water heater may turn on anywhere from around 12:00 AM (noted as hour 0) to 3:00 AM, and generally turns off at 6:00 AM. This usage is indicated at 1630. Times when the water heater is not running is generally seen at 1631. Note that around 6:00 PM (noted as hour 18) at 1632, the water heater appears to briefly run, likely to either maintain temperature or due to use during the evening hours.

Figure 17:
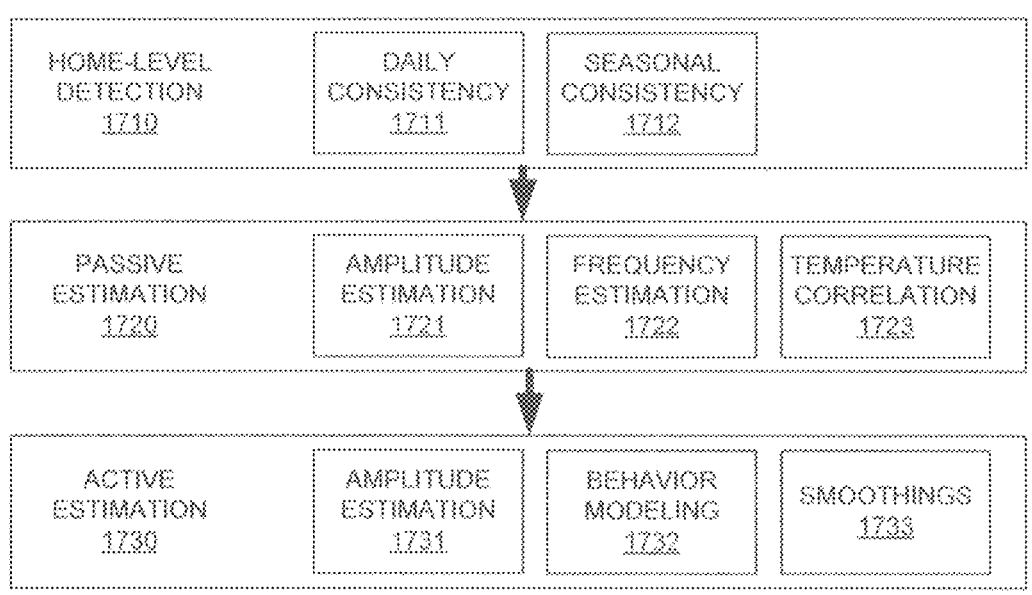
FIG. 17 illustrates, in accordance with some embodiments of the present invention, a flowchart of an exemplary approach to determining water heater usage.

With reference to FIG. 17, a process 1700 of detecting and estimating water heater usage will now be discussed. In general, such process may comprise home-level detection 1710, passive estimation 1720, and active estimation 1730.

Home level detection 1710 may comprise examining or analyzing daily consistency 1711 and seasonal consistency 1712 over time. A significant attribute of an electric water heater is its consistency, both in terms of day-to-day usage and at a high-level season-to-season usage. As long as the home is occupied, the signature of water heater should be present. Depending on the type of water heater, the algorithmic model may capture the presence of each corresponding signature of passive thin pulses, high energy instant pulses during normal hours, and timed high energy pulses—likely during low tariff hours. These signatures may be present everyday (excluding vacation days), and should be present throughout the year and all seasons. Extra care may be needed to avoid false positive, for example coming from HVAC, cooking/laundry appliances and electric vehicle charging. Helpfully, homes which run heating and cooling throughout the year will appear to have consistent passive thin pulses.

Passive estimation 1720 may comprise amplitude estimation 1721, frequency estimation 1722, and temperature correlation 1723. Once home-level detection is established, the amplitude of the thin pulses may be characterized. This may be a combination of the power rating of the water heater, as well as the typical duration of the pulses (which itself is a function of temperature setting of the water heater, its insulation and the outside temperature). If the type of water heater exhibits passive behavior (i.e. thin heating pulses), the model may estimate both the typical amplitude and the frequency of the pulses. Each of these attributes may be heavily influenced by ambient weather temperature, which may be included as part of the model.

Active estimation may comprise amplitude estimation 1731, behavior modeling 1732, and/or smoothings 1733 of the data. First, a model may capture the typical amplitude of a water heater. Then, a user-specific usage pattern of hot water may be modeled. The particular attributes may include time of day (e.g. morning vs evening showers), day of week, weekend or weekday, temperature/season, number of occupants (e.g. number of showers per day), specific appliance usage (laundry, dishwasher), and may even include demographic data such as geographic region, age, gender, socioeconomic status, etc.

Figure 18:
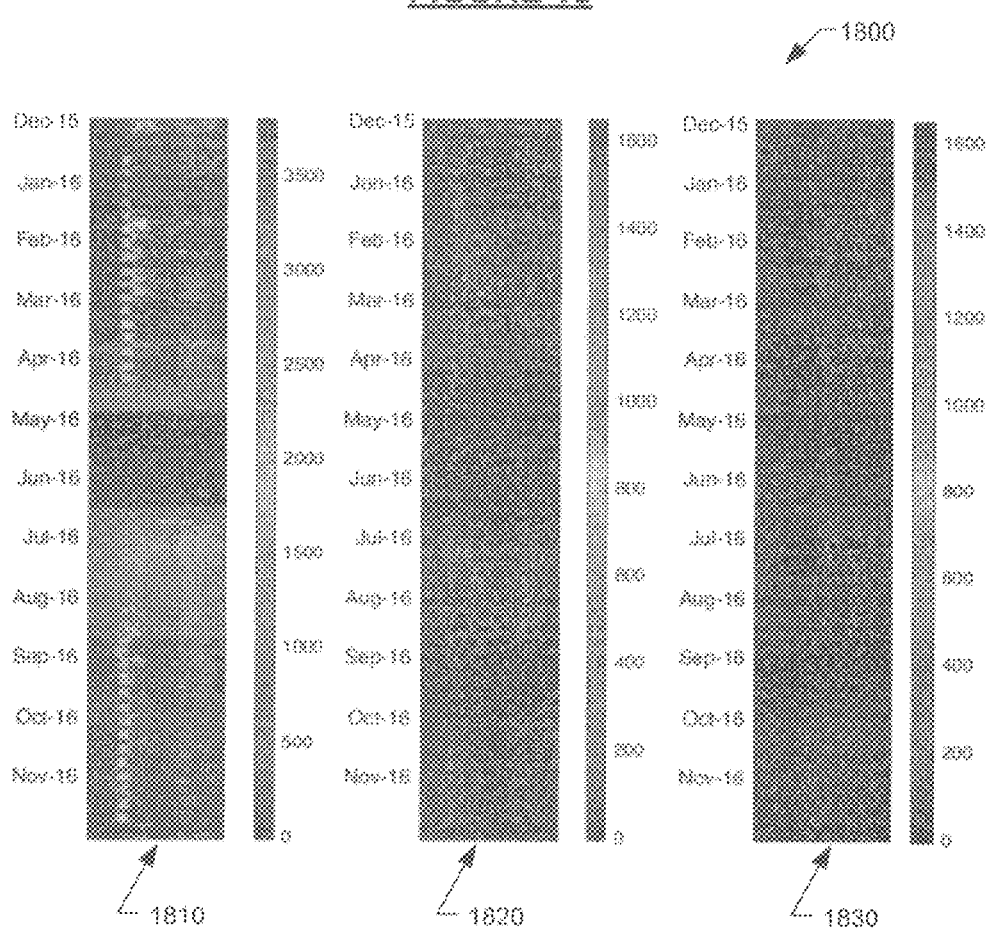
FIG. 18 illustrates, in accordance with some embodiments of the present invention, a heat-map showing an exemplary visualization of results, indicating passive and active water heater energy consumption.

Sample visualization of results of such determinations in accordance with some embodiments of the present invention may be seen at FIG. 18. FIG. 18 illustrates a heat map 1800. FIG. 18 is broken into three (3) columns 1810, 1820, 1830. Column 1810 shows a heatmap of a raw signal received. Column 1820 illustrates the same signal after processing and cleaning. Column 1830 is a heatmap of the detected water heater spikes. FIG. 18 shows how the system can take the raw data and return a heatmap of actual water heater use.

Vacation Detection.

Vacation detection may also be determined based on AMI disaggregated data. In general, data for at least a one (1) month duration is desirable, and may be of a relatively low frequency at fifteen (15) minute, thirty (30) minute, or sixty (60) minute intervals. In general, a vacation may be characterized by multiple consecutive days of static, lower-than-average consumption. Its detection may be confirmed by examining intra-day consumption patterns for the absence of human-driven energy usage.

Figure 19:
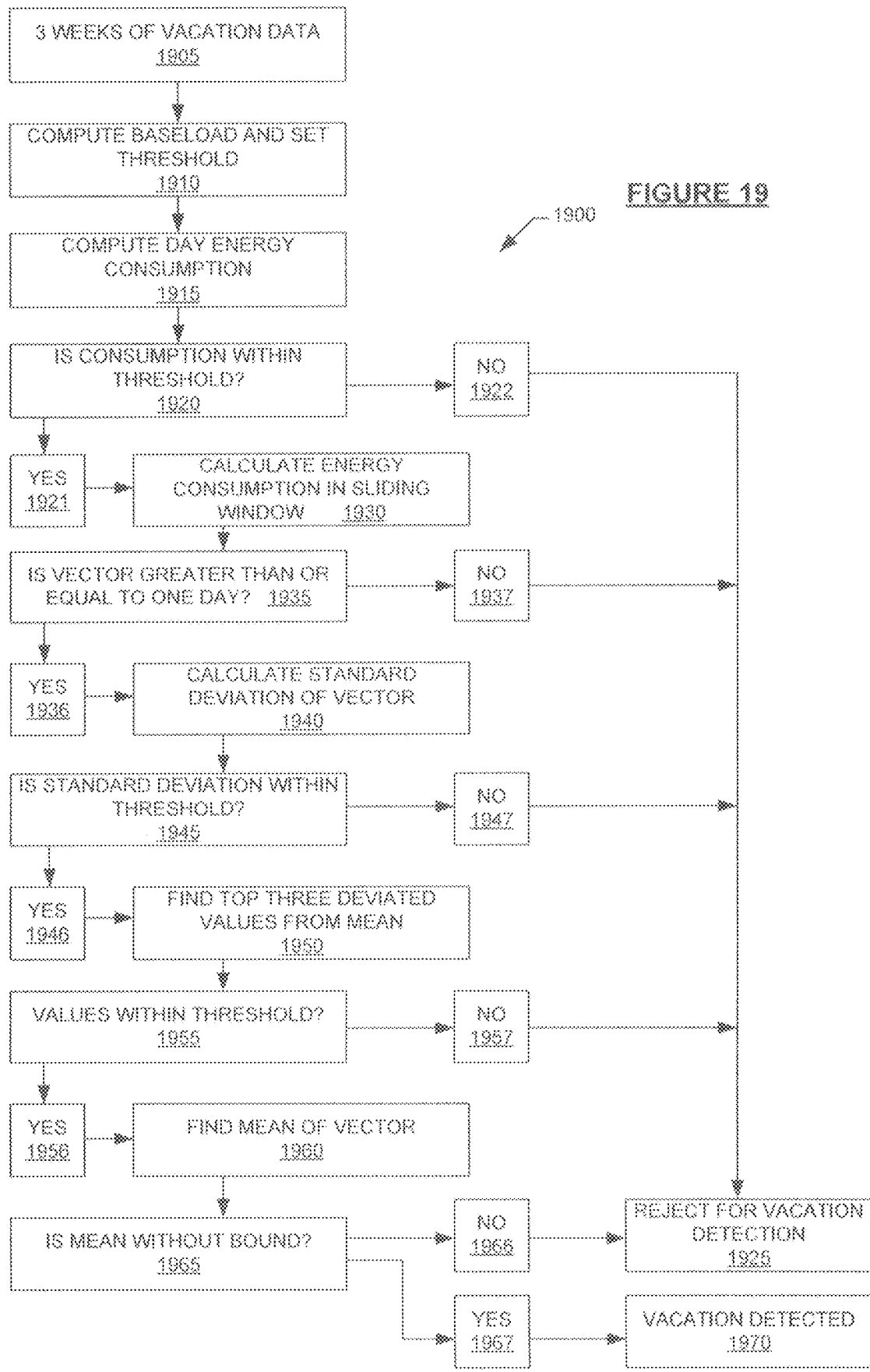
FIG. 19 illustrates, in accordance with some embodiments of the present invention, a flow chart of an exemplary method of vacation detection.

With reference to FIG. 19, a flow chart 1900 illustrates an exemplary process for determining vacation detection, in accordance with some embodiments of the present invention. At 1905 the past three weeks of data are reviewed. At 1910, a baseload is computed using the past data, and a threshold is accordingly set. At 1915, day energy consumption is computed, for example using a one (1) month data set with sampling rate at fifteen (15), thirty (30) or sixty (60) minutes. At 1920, it is determined if the day energy consumption is within the threshold. If it is not within the threshold ("NO" at 1921), then the day is rejected for vacation detection at 1925. If it is within the threshold ("YES") at 1922, then the process continues.

At 1930, in a sliding window fashion with a window size of approximately four (4) hours and sliding by two (2) hours, calculate energy consumption and store it in a vector, break the sliding window until two inconsistent consecutive windows are identified.

At 1935, determine if the size of the vector is greater or equal to one (1) day. If not ("NO" at 1936), reject the day for vacation detection. If so ("YES" at 1937), continue the process.

At 1940, find the standard deviation for the vector. At 1945, determine if the standard deviation is within the threshold. If the standard deviation is not within the threshold ("NO" at 1946), reject the day for vacation detection. If so ("YES" at 1947), continue the process.

At 1950, identify the top three deviated values from the mean for the vector. At 1955, determine if these values are within the threshold. If not ("NO" at 1956), reject the vector for vacation detection. If so ("YES" at 1957), continue the process.

At 1960, determine the mean of the vector. At 1965, determine if the mean of the vector is within the bound of the threshold. If not ("NO" at 1966), reject the vector for vacation detection. If so ("YES" at 1967), then at 1970 vacation is detected with start and end time as the start and end time of the vector.

Figure 20:
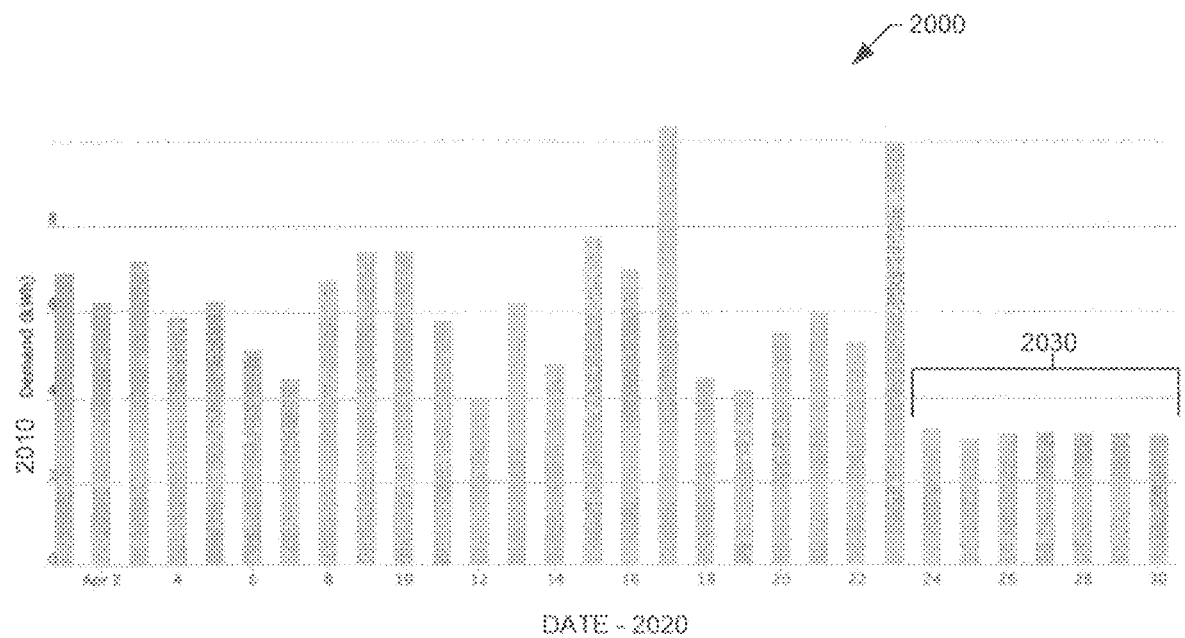
FIG. 20 illustrates, in accordance with some embodiments of the present invention, a graph of exemplary energy usage over a month, indicating vacation.

FIG. 20 illustrates a monthly view 2000 of a vacation analysis, showing demand 2010 over time 2020. Note that time period 2030 indicates a daily consumption drop to a low, static level of approximately 3 kW. This may be a typical indication of a vacation.

Figure 21:
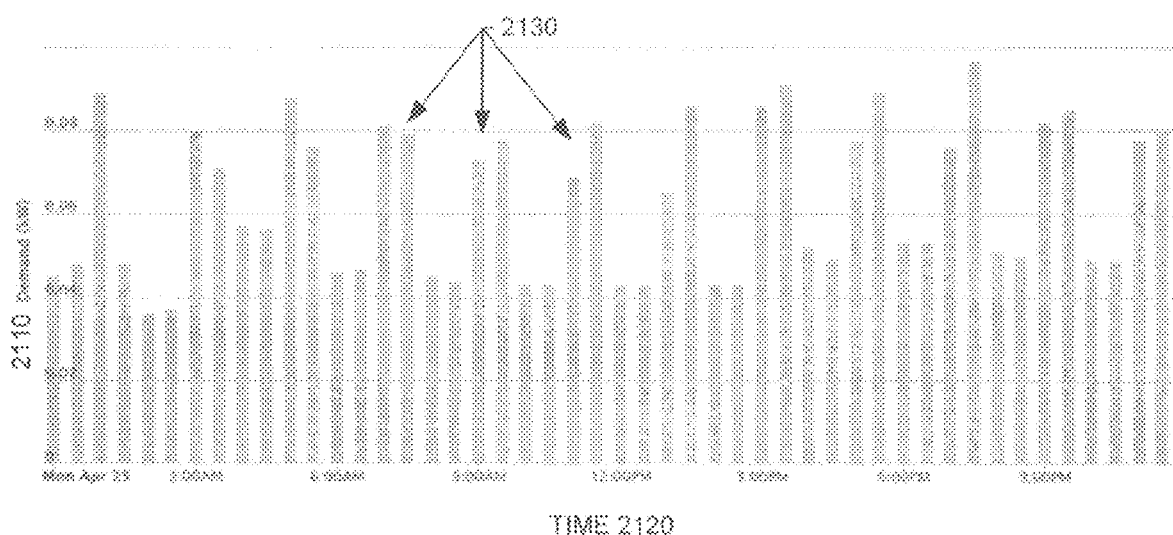
FIG. 21 illustrates, in accordance with some embodiments of the present invention, a graph of exemplary energy usage over a day, indicating vacation.

FIG. 21 illustrates a daily view 2100 of a vacation analysis, again showing demand 2110 over time 2120. Refrigerator pulses 2130 may be seen. However, the refrigerator pulses 2130 are some of the only activity seen in the home. The fact that there is no human-driven energy usage may confirm the vacation profile.

Figure 22:
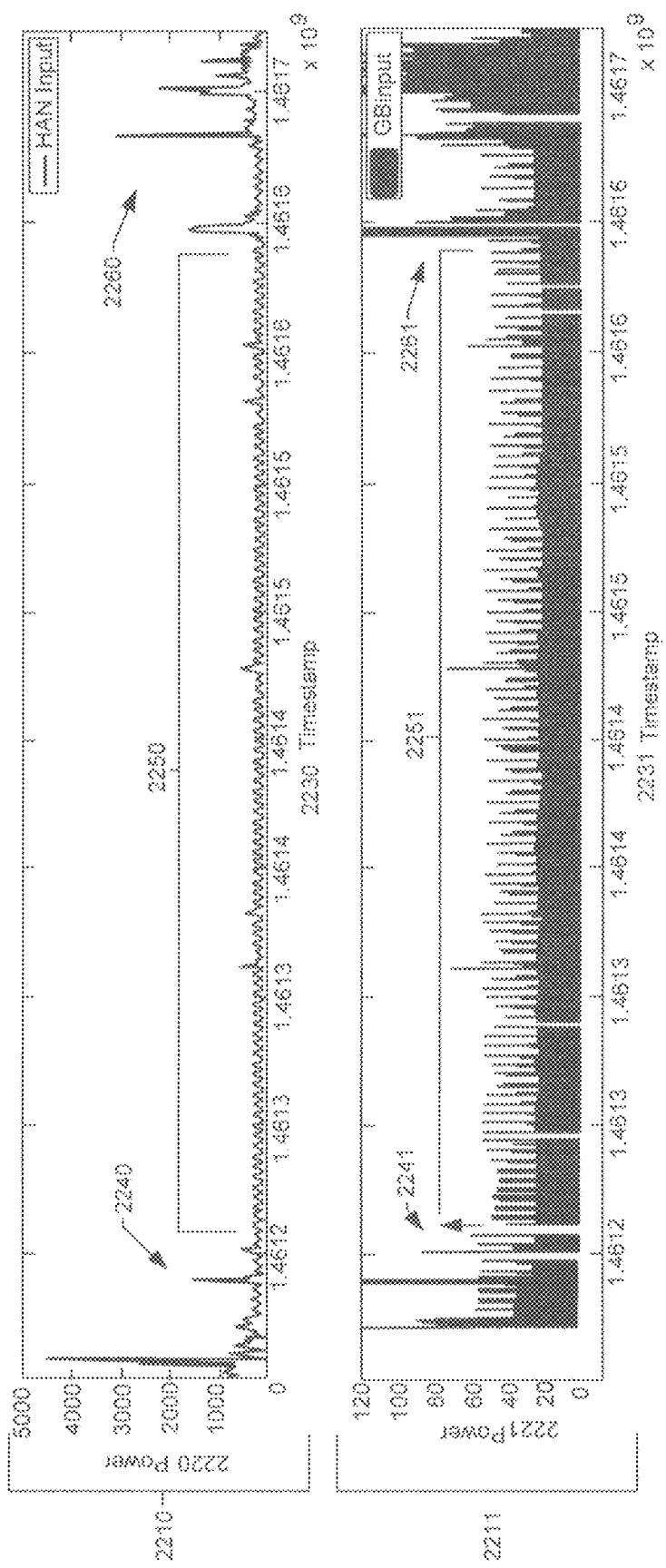
FIG. 22 illustrates, in accordance with some embodiments of the present invention, a graph of exemplary vacation detection of a refrigerator.

FIG. 22 illustrates a more detailed view 2200 of a vacation analysis based on a refrigerator, showing inputs from both a HAN (home area network) device at 2210 and Green Button 2211. In each, demand 2210, 2211 is shown over time 2230, 2231. Typical energy usage may be seen at 2240, 2241, which then tapers to a static low level of consumption at 2250, 2251. Subsequently, energy usage increases again 2260, 2261, indicating an end of the vacation detection.

FIG. 23 illustrates a detailed view 2300 of a vacation analysis based on an electric water heater and refrigerator, showing inputs from both a HAN device 2301 and Green Button 2302. Each shows demand 2310, 2311 over time 2320, 2321. Static usage is seen at 2330, 2331, with an increased usage at 2340, 2341, again indicating an end of vacation detection.

In addition to the above model based on statistical analysis of sliding windows, a day-to-day distance metric can be computed to identify the most similar groups of days. Since vacation days are devoid of human activities, this metric helps the model zoom in on these days.

All disaggregation modules described above may be capable of estimating per-sample appliance loads, with confidence levels associated with each estimation. A post-processing module may be employed to combine the multiple streams of appliance estimations, akin to ensemble methods, and may produce a final disaggregation which is logical and consistent (for example, no overestimation above the raw consumption load).

The final per-sample disaggregation may be further be used as input labels to large-scale supervised techniques. For example, deep learning networks may be trained across a large number of homes. Such models may provide an even smoother and possibly more accurate output, and may be used as checks against the original disaggregation response.

Systems and methods in accordance with some embodiments of the present invention may be combined into an over-arching process. For example, with reference to FIG. 24, an exemplary process flow 2400 will now be discussed. Consumption data is received at 2405. Note that while other data may be used in both disaggregation and itemization (such as but not limited to training data, weather data, sunrise/sunset data, home data, neighborhood/area demographics, tax records, etc.), FIG. 24 shows the treatment of consumption data, as may be received from an AMI device or from a utility.

At 2410 the data is analyzed to determine times of active signal 2415, and times of inactive signal 2420. From the active signal 2415, a lighting estimation module may be applied, resulting in lighting estimation 2425. Similarly, an active water heater estimation module may be applied. From the inactive signal 2420, a passive water heater estimation module may be applied, which, when combined with results from the active water heater estimation, may result in a total water heater estimation 2440. From the inactive signal 2420, vacation detection modules may also be applied, resulting in vacation detection 2445, and refrigeration detection modules may be applied, resulting in refrigeration estimation 2450.

With reference to FIG. 25, an exemplary process 2500 that may utilize both disaggregation and rule-based models may be seen to achieve approximately 100% appliance itemization may be seen. In general, consumption data is received at 2501, and may be provided to both disaggregation based models 2550 and rule based models 2560.

Disaggregation based models may receive the consumption data 2501 and perform an inactivity detection at 2502, identifying both active signal 2504 and inactive signal 2505. Active signal 2504 may be used (similar to as discussed above with reference to FIG. 24) to make a lighting estimation 2506. Active signal 2504 may be used make an estimation of active use of a water heater at 2507.

Inactive signal 2505 may be used to make an estimation of passive use of a water heater at 2508, which may be combined with active water heater estimation 2507 to arrive at a total water heater estimation 2509. Inactive signal 2505 may also be used to make a vacation detection 2510 and/or a refrigerator estimation 2511.

In accordance with some embodiments of the present invention, the inactive signal 2505 may also be used to provide an identification and estimation of a pool pump 2512, heating appliances 2513, and/or cooling appliances 2514. Note that other data may be used in these determinations, such as the use of temperature data 2515 in the heating and cooling estimations 2513, 2514. These itemizations and estimations may constitute an itemization by disaggregation 2516.

Consumption data 2501 may also be used by rule-based models 2503 to perform rule-based itemization and estimation. Note that while not shown on FIG. 25, rule-based models may also utilize additional information, such as but not limited to training data, weather data, sunrise/sunset data, home data, home demographics, neighborhood/area demographics, tax records, etc. Such information may be found in publicly available data stores (such as tax records, weather data, etc.), or may be maintained by the utility or the party performing disaggregation and itemization (such as training data).

Rule based models 2503 may be used to determine an itemization and estimation, including but not limited to, a cooking estimation 2517, a laundry estimation 2518, an entertainment estimation 2519, and an "other" or miscellaneous estimation 2520. Each of these may constitute a rule based itemization 2521.

Combining itemization by disaggregation 2516 and rule based disaggregation may result in approximately 100% itemization 2522. This substantially complete itemization may provide customers with confidence sufficient that customers may be more persuaded to act on various recommendations or proposals received that may suggest ways to reduce consumption and/or cost.

What is claimed is:

1. A method of performing appliance itemization based on consumption data for a whole house, comprising:
   receiving at a processor the consumption data;
   determining by the processor if the consumption data includes active signals and/or inactive signals;
   upon detection of an active signal:
     detecting by the processor, based at least in part on the active signal, active water heating, and if active water heating is detected, estimating active water heating consumption;
     detecting by the processor, based at least in part on the active signal, lighting, and if lighting is detected, estimating lighting consumption;
   upon detection of an inactive signal:
   detecting by the processor, based at least in part on the inactive signal, passive water heating, and if detected, estimating passive water heating consumption;
   detecting by the processor, based at least in part on the inactive signal, refrigeration, and if refrigeration is detected, estimating refrigerator consumption;
   detecting by the processor, based at least in part on the inactive signal, vacation mode.

2. The method of claim 1, wherein the consumption data is received from a utility.

3. The method of claim 1, wherein the consumption data is received from an advanced metering infrastructure (AMI) device.

4. The method of claim 1, wherein the consumption data is of a low resolution comprising data received at fifteen (15) minute, thirty (30) minute, or sixty (60) minute intervals.

5. The method of claim 1, wherein the processor determines if the consumption data includes active signals and/or inactive signals based at least in part upon:
   using a sliding window function and storing the energy consumption in a vector;
   subsequently comparing the vector with lowest energy consumption windows to determine inactivity.

6. The method of claim 5, wherein the processor estimates active water heater consumption by estimating a typical amplitude of a water heater, behavior modeling, and data smoothing.

7. The method of claim 6, wherein behavior modeling comprises user-specific patterns are modeled, including attributes of time of day and day of week.

8. The method of claim 7, wherein attributes may further include characteristics selected from the group consisting of temperature, season, number of occupants of the house, specific appliance usage, and demographic data including geographic region, age of occupants, gender of occupants, and/or socioeconomic status of occupants.

9. The method of claim 1, wherein the processor detects lighting based at least in part by identifying arcs of consumption in time periods where lighting is expected to be used, wherein identifying arcs of consumption comprises:
removing unsuitable data points from the consumption data;
cleaning the consumption data using percentile filtering, minimum value removal, and/or smoothing noise removal;
detecting and removing seasonal loads by selecting time points showing seasonal characteristics including contiguous days of absence or presence when typically occurring lighting is absent;
extracting a lighting band, comprising a collection of times in a day at which lighting is present.

10. The method of claim 9, wherein the processor estimates lighting consumption at each data point along with lighting capacity parameters, timings of lighting, and seasonality.

11. The method of claim 1, wherein the processor detects passive water heating by amplitude estimation, frequency estimation, and temperature correlation.

12. The method of claim 11, wherein the processor estimates passive water heating consumption by estimating typical amplitude and frequency of passive pulses, determined by a power rating of a detected water heater and the typical duration of passive pulses, wherein the duration of passive pulses is a function of a temperature setting of the water heater, insulation of the water heater, and the outside temperature.

13. The method of claim 1, wherein the processor detects refrigeration by analyzing data during low activity periods in which regular pulses of a refrigeration compressor motor are detectable.

14. The method of claim 13, wherein the processor estimates refrigerator consumption by:
analyzing several months of consumption data and identifying low activity periods;
scoring each low activity period for quality;
compiling low activity periods that meet a quality threshold;
using a machine learning model to, based on the low activity periods that meet the quality threshold, predict refrigeration consumption.

15. The method of claim 14, wherein the machine learning model is a regression model based at least in part on training data.

16. The method of claim 1, wherein the processor detects vacation mode by identifying multiple consecutive days of static, lower-than-average consumption.

17. The method of claim 16, wherein identifying multiple consecutive days of static, lower-than-average consumption comprises:
reviewing consumption data spanning the previous three (3) weeks;
calculating a baseload based on previous consumption data and setting a threshold;
calculating day energy consumption, and determining if day energy consumption is within the threshold;
if the day energy is within the threshold, calculate energy consumption based at least in part on the use of a sliding window function, with a window size of approximately four (4) hours by two (2) hours, and storing the energy consumption in a vector;
determine if the size of the vector is greater than one day, and if so, determine the standard deviation for the vector;
determine if the standard deviation for the vector is within the threshold, and if so, identify the top three deviated values from the mean of the vector;
determine if the top three deviated values from the mean of the vector are within the threshold, and if so determine the mean of the vector;
determine if the mean of the vector is within the threshold;
if the mean of the vector is within the threshold, a vacation is detected with start and end time as the start and end time of the vector.

18. The method of claim 1, further comprising:
providing to a customer an itemization of detected appliances and estimated consumption for each detected appliance.

19. A method of performing appliance itemization based on consumption data for a whole house received from an advanced metering infrastructure (AMI) device, the consumption data being of a low resolution comprising data received at fifteen (15) minute, thirty (30) minute, or sixty (60) minute intervals, the method comprising:
receiving at a processor the consumption data;
determining by the processor if the consumption data includes active signals and/or inactive signals;
upon detection of an active signal:
detecting by the processor, based at least in part on the active signal, active water heating, and if active water heating is detected, estimating active water heating consumption at least in part by estimating a typical amplitude of a water heater, behavior modeling, and data smoothing, wherein behavior modeling comprises user-specific patterns are modeled, including attributes of time of day and day of week;
detecting by the processor, based at least in part on the active signal, lighting based at least in part by identifying arcs of consumption in time periods where lighting is expected to be used, wherein identifying arcs of consumption comprises:
removing unsuitable data points from the consumption data;
cleaning the consumption data using percentile filtering, minimum value removal, and/or smoothing noise removal;
detecting and removing seasonal loads by selecting time points showing seasonal characteristics including contiguous days of absence or presence when typically occurring lighting is absent;
extracting a lighting band, comprising a collection of times in a day at which lighting is present;
if lighting is detected, estimating lighting consumption at each data point along with lighting capacity parameters, timings of lighting, and seasonality;
upon detection of an inactive signal:
detecting by the processor, based at least in part on the inactive signal, passive water heating based at least in part on amplitude estimation, frequency estimation, and temperature correlation, and if detected, estimating passive water heating consumption at least in part by estimating typical amplitude and frequency of passive pulses, determined by a power rating of a detected water heater and the typical duration of passive pulses, wherein the duration of passive pulses is a function of a temperature setting of the water heater, insulation of the water heater, and the outside temperature;

detecting by the processor, based at least in part on the inactive signal, refrigeration at least in part by analyzing data during low activity periods in which regular pulses of a refrigeration compressor motor are detectable, and if refrigeration is detected, estimating refrigerator consumption at least in part by:
   analyzing several months of consumption data and identifying low activity periods;
   scoring each low activity period for quality;
   compiling low activity periods that meet a quality threshold;
   using a regression machine learning model to, based on the low activity periods that meet the quality threshold, predict refrigeration consumption; and
detecting by the processor, based at least in part on the inactive signal, vacation mode by identifying multiple consecutive days of static, lower-than-average consumption; and
providing to a customer an itemization of detected appliances and estimated consumption for each detected appliance.

20. A method of performing appliance itemization based at least in part on consumption data for a whole house received from an advanced metering infrastructure (AMI) device, the consumption data being of a low resolution comprising data received at fifteen (15) minute, thirty (30) minute, or sixty (60) minute intervals, the method comprising:
   applying disaggregation models to the consumption data to provide detection and estimation of any present lighting appliances, water heating appliances, refrigeration appliances, pool pumps, heating appliances, or cooling appliances;
   applying rule-based models to the consumption data to provide detection and estimation of any present cooking appliances, laundry appliances, entertainment devices or appliances, and miscellaneous appliances;
   wherein the disaggregation models and the rule-based models provide for a complete or near complete appliance level itemization and estimation for the whole house.

* * * * *